(12) United States Patent
Akimoto

(10) Patent No.: US 8,899,376 B2
(45) Date of Patent: Dec. 2, 2014

(54) CUSHIONING DEVICE AND METAL COVER

(71) Applicant: Sanwa Packing Industry Co., Ltd., Osaka (JP)

(72) Inventor: Kazuyo Akimoto, Osaka (JP)

(73) Assignee: Sanwa Packing Industry Co., Ltd., Osaka (JP)

( * ) Notice: Subject to any disclaimer, the term of this patent is extended or adjusted under 35 U.S.C. 154(b) by 187 days.

(21) Appl. No.: 13/724,998

(22) Filed: Dec. 21, 2012

(65) Prior Publication Data

US 2013/0241122 A1 Sep. 19, 2013

Related U.S. Application Data

(63) Continuation of application No. PCT/JP2011/057992, filed on Mar. 30, 2011.

(30) Foreign Application Priority Data

Dec. 22, 2010 (JP) .................... 2010-286348

(51) Int. Cl.
| | | |
|---|---|---|
| *F16F 7/00* | (2006.01) | |
| *F01N 13/18* | (2010.01) | |
| *F01N 13/10* | (2010.01) | |
| *F16F 1/06* | (2006.01) | |
| *F16F 1/12* | (2006.01) | |

(52) U.S. Cl.
CPC .............. *F16F 7/00* (2013.01); *F01N 13/1811* (2013.01); *F01N 13/1872* (2013.01); *F01N 2260/20* (2013.01); *F01N 13/10* (2013.01); *F16F 1/06* (2013.01); *F16F 1/125* (2013.01)
USPC ... 181/209; 181/207; 267/140.11; 267/140.4; 248/610

(58) Field of Classification Search
CPC . F01N 13/10; F01N 13/1811; F01N 13/1872; F01N 2260/20; F16F 7/00; F16F 1/125; F16F 1/06

USPC ............. 181/204, 205, 207, 209; 267/104.11, 267/136, 140.4, 141, 141.1–141.7; 248/610, 611, 624
See application file for complete search history.

(56) References Cited

U.S. PATENT DOCUMENTS 3,028,138 A * 4/1962 Wells ............................ 248/619
3,107,905 A * 10/1963 Lucas ........................... 267/161

(Continued)

FOREIGN PATENT DOCUMENTS

| JP | 62-46294 B2 | 10/1987 |
| JP | 2004-360496 A | 12/2004 |

(Continued)

OTHER PUBLICATIONS

International Search Report issued in PCT/JP2011/057992, mailed Jul. 5, 2011, 2 pages.

*Primary Examiner* — Jeremy Luks
(74) *Attorney, Agent, or Firm* — Osha Liang LLP

(57) ABSTRACT

The present invention has an object of providing a cushioning device having a stable and superb vibration-damping property and a metal cover attachable by use of the cushioning device. A cushioning device, which is to be located between an exhaust manifold as a vibration source and a heat insulator as a connection target and connects the exhaust manifold and the heat insulator to each other and cushions transmission of a vibration from the exhaust manifold to the heat insulator, includes a multi-stage coiled and spiral spring for cushioning the vibration, a grommet for joining the multi-stage coiled and spiral spring and the heat insulator to each other, and a collar member located between an attaching bolt tightened to the exhaust manifold and the multi-stage coiled and spiral spring. The multi-stage coiled and spiral spring is formed of a wiring member having a spiral shape as seen in a plan view.

13 Claims, 15 Drawing Sheets

(56) References Cited

U.S. PATENT DOCUMENTS

| | | | | |
|---|---|---|---|---|
| 4,498,433 | A * | 2/1985 | Ogawa | 123/90.38 |
| 6,318,734 | B1 * | 11/2001 | Boskamp | 277/598 |
| 6,561,312 | B2 * | 5/2003 | Stanienda | 181/207 |
| 6,565,158 | B2 * | 5/2003 | Seimiya | 301/6.91 |
| 7,065,963 | B2 * | 6/2006 | Niwa | 60/323 |
| 7,273,128 | B2 * | 9/2007 | Niwa et al. | 181/209 |
| 2005/0028519 | A1 * | 2/2005 | Ishiwa | 60/323 |
| 2005/0140075 | A1 * | 6/2005 | Mishima | 267/140.11 |
| 2010/0101528 | A1 * | 4/2010 | Fonville et al. | 123/198 E |

FOREIGN PATENT DOCUMENTS

| | | | |
|---|---|---|---|
| JP | 2005-133594 A | | 5/2005 |
| JP | 2010156372 A | * | 7/2010 |

* cited by examiner

FIG. 7A
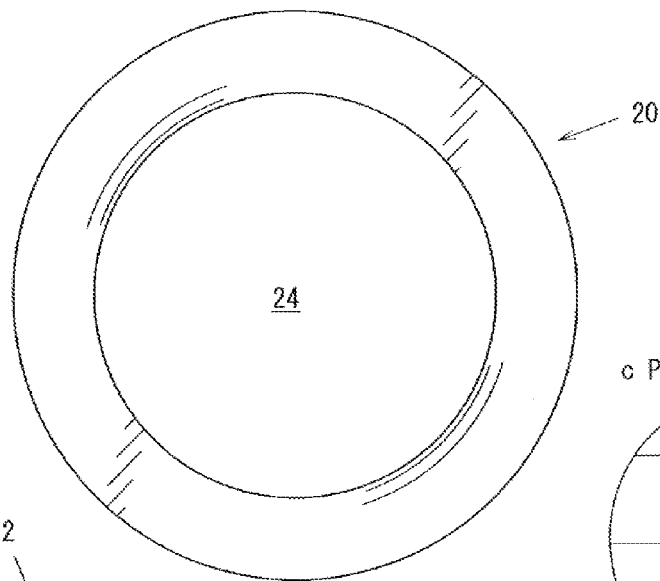
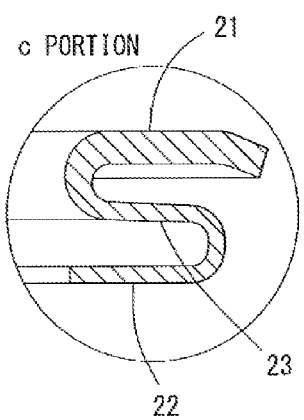
c PORTION
FIG. 7B
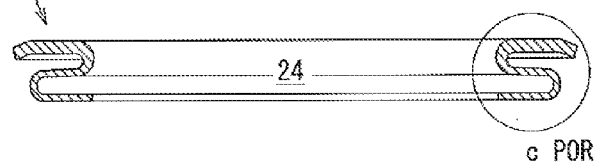
c PORTION
FIG. 7C
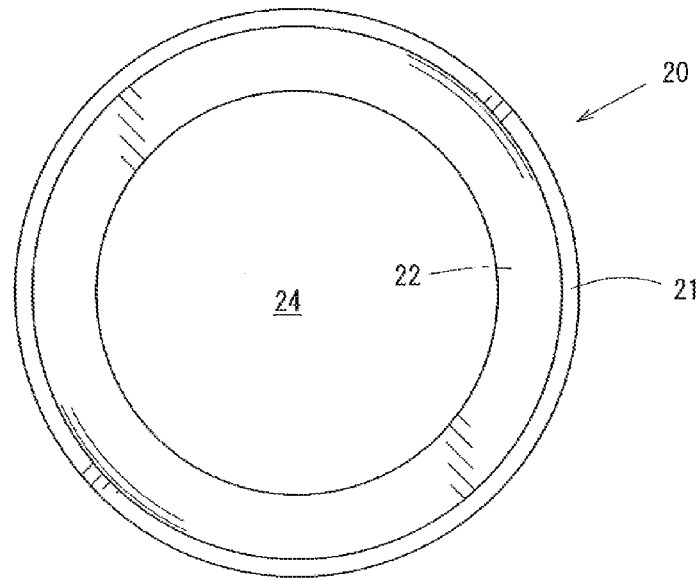

CUSHIONING DEVICE AND METAL COVER

TECHNICAL FIELD

The present invention relates to a cushioning device usable for, for example, attaching a cover, a housing or the like to a member which generates vibration, and particularly to a cushioning device usable for attaching a cover such as a heat insulator or the like to an exhaust manifold of an internal combustion engine or the like and a metal cover attachable by use of the cushioning device.

BACKGROUND ART

As shown in, for example, FIG. 10, an exhaust manifold 1 attached to a side surface of an engine 2 vibrates itself and generates a vibrant because combustion exhaust gas of which pressure or temperature pulsates passes inside the exhaust manifold 1 when the engine is driven. The exhaust manifold 1 is heated by the combustion exhaust gas having a high temperature which passes inside the exhaust manifold 1 and thus generates heat itself. In order to suppress the vibrant or the heat generated in this manner by the exhaust manifold 1 from being transmitted to an area around the engine 2, a heat insulator 3 is attached so as to cover the exhaust manifold 1.

However, when the heat insulator 3 is directly attached to the vibrating exhausting manifold 1 or engine 2, there is an undesirable possibility that the heat insulator 3 resonates to become a vibration source itself and thus enlarges the noise.

Under these circumstances, Patent Document 1 proposes a cushioning device 5 having a floating mount structure (see FIG. 15) for attaching a heat insulator 3 to the exhaust manifold 1 of the engine 2 as described above. FIG. 15 is a cross-sectional view of the cushioning device 5 proposed in Patent document 1 specified below.

The cushioning device 5 of the conventional art includes an annular cushioning member 8 formed by knitting metal fibers into a mesh and putting the resultant metal fiber mesh into a planar mat-like shape, a grommet 20 which is a coupling member formed of an aluminum alloy and having a generally S-shaped cross-section, and a collar member 10 located between the cushioning member 8 and an attaching bolt 42.

Between the collar member 10 and the cushioning member 8, a gap 17 is formed in an axial direction and in a radial direction of the attaching bolt 42. It is described in Patent Document 1 that owing to the gap 17, the vibration input from the exhaust manifold 1 is suppressed from being transmitted from the collar member 10 to the cushioning member 8; namely, the cushioning device 5 has a superb vibration-damping property.

In more detail, Patent Document 1 describes as follows. The vibration transmitted from the collar member 10 to the cushioning member 8 causes the cushioning member 8 itself to make a flexural motion. Owing this flexural motion, the cushioning device 5 converts the vibration energy of the vibration transmitted from the collar member 10 into a kinetic energy of the flexure of the cushioning member 8 and thus can suppress the vibration from being transmitted to the heat insulator 3.

However, since the gap 17 in which the cushioning member 8 is loosely movable inside the collar member 10 is provided between the collar member 10 and the cushioning member 8, the cushioning member 8 vibrates inside the collar member 10 and thus collides against the collar member 10. The collision of the cushioning member 8 against and the collar member 10 may undesirably generate a rattling noise. Namely, the gap 17 provided for suppressing the vibration from being transmitted from the collar member 10 to the cushioning member 8 acts as a play between the collar member 10 and the cushioning member 8 to generate a different type of noise. Generation of such a different type of noise is considered to mean that another vibration is generated, which inhibits the vibration-damping property.

CITATION LIST

Patent Literature

Patent Document 1: Japanese Laid-Open Patent Publication No. 2004-360496

SUMMARY OF INVENTION

Technical Problem

The present invention has an object of providing a cushioning device having a stable and superb vibration-damping property and a metal cover attachable by use of the cushioning device.

Solution to Problem

The present invention is directed to a cushioning device to be located between a vibration target member, which is a vibration source, and a connection target member, which is a connection target, the cushioning device connecting the vibration target member and the connection target member to each other and cushioning transmission of a vibration from the vibration target member to the connection target member. The cushioning device comprises a cushioning member for cushioning the vibration, a joining member for joining the cushioning member and the connection target member to each other, and a collar member located between a tightening member tightened to the vibration target member and the cushioning member. The joining member includes a first holding portion for enclosing the cushioning member and holding the connection target member on a diametrically outer side; a second holding portion for holding the cushioning member on a diametrically inner side; and a coupling portion for coupling the first holding portion and the second holding portion to each other. The collar member includes a tightening member insertion portion, provided on the diametrically inner side, for allowing the tightening member to pass therethrough and a cushioning member holding portion, provided on the diametrically outer side, for holding a collar member attaching portion. The cushioning member is formed of a wiring member having a spiral shape as seen in a plan view, and includes the collar member attaching portion, provided at a diametrically central part of the spiral shape as seen in a plan view, for allowing attachment of the collar member and a held portion held by the second holding portion, the held portion being provided in a diametrically outer part of the spiral shape as seen in a plan view. At least a part of the spiral shape as seen in a plan view of the cushioning member has a high spring portion having a spring constant higher than that of another portion of the spiral shape as seen in a plan view.

The vibration target member may be, for example, an engine main body of an automobile or the like, an exhaust pipe (especially, exhaust manifold) attached to the engine, a catalyst part, a frame forming the vehicle body or the like.

The connection target member may be a heat insulator connected to, and covers, the engine main body, the exhaust pipe, the catalyst part or the like; or an undercover for covering the bottom of the vehicle body, a mission cover or the like.

The joining member may be a so-called grommet.

The tightening member may be, for example, a bolt or a nut for coupling the vibration target member and the collar member to each other by screwing, or a caulking jig or the like.

As seen in a plan view or two-dimensionally, the spiral shape may be formed of a circularly curved line which is at least partially distanced from the center as going toward the outer end, or may be formed of a straight line which bends at corners like drawing polygon-like shapes and is at least partially distanced from the center as going toward the outer end.

The wiring member may be appropriately selected in accordance with the frequency band or amplitude of the vibration to be suppressed and various conditions of use such as the temperature and the like, and the cross-section thereof may be circular, elliptical, generally rectangular, or of any other optional shape of a closed curved surface.

The diametrically inner side is on the side of the center of the spiral shape as seen in a plan view as opposed to the outer side as seen in a plan view, and the diametrically outer side is the outer side of the spiral shape as seen in a plan view as opposed to the center as seen in a plan view.

The high spring portion having a spring constant higher than that of the another portion may be formed of, for example, a wiring member wound at a narrow pitch, a wiring member having a high spring constant, or a wiring member having the same spring constant but having a larger diameter. A high spring portion having a spring constant or an apparent spring constant higher than that of the another portion, which is included in at least a part of the spiral shape as seen in a plan view of the cushioning member may be located in at least a position among an inner end, an outer end or an intermediate position therebetween of the spiral shape as seen in a plan view.

According to the present invention, a stable and superb vibration-damping property can be provided.

This will be described in more detail. The cushioning member is formed of a wiring member having a spiral shape as seen in a plan view. The collar member attaching portion for allowing the collar member to be attached thereto is provided at the diametrically central part of the spiral shape as seen in a plan view, and the cushioning member holding portion for holding the collar member attaching portion is provided on the diametrically outer side of the collar member. Therefore, the vibration transmitted from the collar member to the cushioning member causes the cushioning member itself formed of the wiring member having a spiral shape as seen in a plan view to make a flexural motion. Owing this flexural motion, the cushioning device converts the vibration energy of the vibration transmitted from the collar member into a kinetic energy of the flexure of the cushioning member, and thus can suppress the vibration from being transmitted to the connection target member. Namely, the function of the gap of the conventional art, which is actively formed in the axial direction and the radial direction (planar direction) between the collar member and the cushioning member in the cushioning device such that the collar member and the cushioning member are loosely movable, is realized by a clearance between the winds of the wiring member formed to have a spiral shape as seen in a plan view. Thus, the transmission of the input vibration is suppressed; namely, a superb vibration-damping property is realized.

The collar member attaching portion for allowing the collar member to be attached thereto is provided at the diametrically central part of the spiral shape as seen in a plan view, and the cushioning member holding portion for holding the collar member attaching portion is provided on the diametrically outer side of the collar member. Therefore, the vibration can be suppressed from being transmitted without any collision of the cushioning member against the collar member. Accordingly, the vibration is suppressed from being transmitted from the collar member to the cushioning member with no rattling noise caused by the collision of the cushioning member against the collar member. Namely, a superb vibration-damping property can be provided.

The cushioning member is formed of the wiring member having a spiral shape as seen in a plan view. Such cushioning members as products are less varied as compared with a cushioning member formed by knitting metal fibers into a mesh and putting the resultant metal fiber mesh into a mat-like shape. Such a cushioning member has a stable elasticity. Namely, the cushioning device has a stable vibration-damping property.

This will be described in more detail. The cushioning member is formed of a wiring member formed by molding to have a spiral shape as seen in a plan view. Therefore, it is not necessary to handle minute inorganic fibers, which solves the difficulty in managing the fiber length in a step of cutting the inorganic fibers to a prescribed length or the difficulty in managing the size precision so that the size precision is kept high in a step of processing the fibers into final products. Owing to this, the size precision can be improved, and the precision and the stability of the vibration-damping property of the cushioning device can be improved.

Accordingly, by adopting the above-described structure for the cushioning device, the vibration target member, which is a vibration source, and the connection target member can be connected to each other with no vibration being transmitted.

In addition, at least a part of the spiral shape as seen in a plan view of the cushioning member has a high spring portion having a spring constant higher than that of another portion of the spiral shape as seen in a plan view. Owing to this, the cushioning device can have desired cushioning characteristics.

This will be described in more detail. One cushioning member having a spiral shape as seen in a plan view includes a high spring portion having a high spring constant or a high apparent spring constant and a portion having a spring constant lower than that of the high spring portion. Therefore, a small vibration is absorbed by the portion having a low spring constant, whereas a part of a large vibration which cannot be absorbed by the portion having a low spring constant is absorbed by the high spring portion. In this manner, a more appropriate vibration absorption performance can be provided in accordance with the vibration behavior as compared with the case where, for example, both of a large vibration and a small vibration are absorbed only by the high spring portion. Accordingly, the cushioning member and the cushioning device can have desired cushioning characteristics.

In an embodiment of the present invention, the high spring portion may be formed of a coiled portion wound in a generally cylindrical shape extending in a height direction; and the another portion having a spring constant lower than that of the coiled portion may be formed of a spiral portion having a level in the height direction gradually changed along a spiral direction.

The coiled portion wound in the generally cylindrical shape extending in the height direction is wound in a cylindrical shape, a conical shape or a drum shape as seen in a side view, and may be a so-called coiled spring.

The spiral portion having a level in the height direction gradually changed along the spiral direction extends like drawing a three-dimensional curve which, as being whirled, proceeds in a direction in which the curve has a vertical component to the whirling surface, and may be a so-called helix.

According to the present invention, a cushioning device having desired cushioning characteristics can be provided easily.

This will be described in more detail. In the coiled portion and in the spiral portion, the winding pitch of the wiring member is different. Therefore, the coiled portion having a high apparent spring constant and the spiral portion having a spring constant lower than that of the coiled portion can be provided easily by use of the wiring member having the same spring constant and the same cross-sectional diameter. Namely, as described above, the spring constant of the cushioning member can be appropriately set easily in accordance with the vibration behavior such that the cushioning member has both of the high spring portion having a high apparent spring constant and the portion having a spring constant lower than that of the high spring portion. Accordingly, the cushioning member and the cushioning device can have desired cushioning characteristics.

The cushioning member includes the cylindrical coiled portion and the spiral portion. Owing to this, the cushioning member can have a more desirable spring constant as compared with a cushioning member formed merely of the spiral portion or merely of the coiled portion so as to have a desired height.

This will be described in more detail. In the case where the cushioning member is formed merely of the spiral portion so as to have a desired height, the pitch of the wiring member used to form the spiral portion becomes too large and thus the spring constant is decreased. As a result, a desired elasticity cannot be guaranteed. By contrast, in the case where merely the cylindrical coiled spring is used, the joining member on the diametrically outer side and the collar member on the diametrically inner side cannot be joined together in a cushionable manner.

In order to improve the vibration-damping property, the wiring member of the cushioning member needs to be long. In the case where only the spiral portion is formed of a wiring member having a length appropriate for guaranteeing the desired vibration-damping property in the state where the outer diameter of the wiring member is restricted by the second holding portion of the joining member, the number of winds of the wiring member used to form the spiral portion is increased, and thus the winding pitch of the wiring member in the planar direction is decreased. As a result, the vibration absorption performance in the planar direction is lowered, which inhibits the improvement of the vibration-damping property.

By contrast, in the case where the cushioning member includes the cylindrical coiled portion and the spiral portion, the elasticity in the diametric direction and the height direction is guaranteed by the spiral portion, and a desired height is realized by the coiled portion having a high spring constant. Thus, the cushioning member can have a desired spring constant.

In an embodiment of the present invention, the cushioning member may be located in such a direction that the held portion is farther from the vibration target member than the collar member attaching portion is.

The expression that the cushioning member is "located in such a direction that the held portion is farther from the vibration target member than the collar member attaching portion is" means that the cushioning member, including the spiral portion having a level in the height direction gradually changed and the coiled portion, is located in such a direction that the held portion is located farther from the vibration target member than the collar member attaching portion is.

According to this structure, the vibration-damping property of the cushioning device can be improved.

This will be described in more detail. The cushioning member includes the coiled portion and the spiral portion. Owing to this, the elasticity of the cushioning member can be adjusted in the height direction in addition to the planar direction by use of two spring constants. Namely, the elasticity of the cushioning member, which significantly influences the vibration-damping property of the cushioning member, can be adjusted three-dimensionally based on the two spring constants.

The cushioning member is located in such a direction that the held portion is farther from the vibration target member than the collar member attaching portion is. Owing to this, the held portion on the diametrically outer side of the cushioning member is farther from the vibration target member than the collar member attaching portion on the diametrically inner side is. Namely, the connection target member held by the first holding portion of the coupling member, which holds the held portion by the second holding portion, is located farther from the vibration target member than the collar member wound around the collar member attaching portion is.

Accordingly, even when the connection target member itself vibrates by the vibration transmitted via the collar member and the cushioning member, the undesirable possibility that the connection target member itself collides against the vibration target member can be reduced as compared with the case where the collar member is located farther from the vibration target member than the connection target member is. As a result, the generation of noise caused by the collision of the connection target member itself against the vibration target member can be suppressed.

In this manner, the cushioning device, by adopting the above-described structure, provides a still improved vibration-damping property.

In an embodiment of the present invention, the collar member attaching portion may be included in the coiled portion, and the held portion may be included in a diametrically outer part of the spiral portion.

According to this structure, the coiled portion is located on the diametrically inner side of the cushioning member on which the collar member attaching portion is provided, and the spiral portion is located on the diametrically outer side of the cushioning member on which the held portion is provided. Owing to this structure, the vibration which is input via the collar member is first input to the spiral portion on the diametrically outer side and is cushioned by the elasticity in the planar direction and the height direction. The vibration which is cushioned by the spiral portion is further cushioned by the coiled portion having a high apparent spring constant. Therefore, the undesirable possibility that the connection target member itself collides against the vibration target member can be further reduced. As a result, generation of noise caused by the collision of the connection target member itself against the vibration target member can be suppressed.

In an embodiment of the present invention, the collar member attaching portion and the held portion may have an arcked shape; the second holding portion may have an annular shape as seen in a plan view; and the collar member may have a cylindrical shape, and the cushioning member holding portion may be a fitting recess, formed in a side surface of the cylindrical collar member, for allowing the collar member attaching portion to fit thereinto.

According to the present invention, the cushioning member and the collar member can be fitted together easily, and the held portion can be held by the second holding portion.

This will be described in more detail. The collar member attaching portion and the held portion are formed to be arced. In addition, as the cushioning member holding portion, the fitting recess for allowing the collar member attaching portion to fit thereinto is formed in a side surface of the cylindrical collar member. Therefore, the collar member attaching portion formed to be arced is fitted into the fitting recess formed in the side surface of the cylindrical collar member. Thus, the cushioning member and the collar member can be fitted into each other easily. Since the collar member attaching portion formed to be arced and the fitting recess formed in the side surface of the cylindrical collar member are fitted into each other, the cushioning member and the collar member can be fitted into each other easily regardless of the position of the cushioning member in the circumferential direction with respect to the collar member.

The held portion is formed to be arced, and thus can be held by the second holding portion regardless of the position of the held portion in the circumferential direction.

In this manner, the cushioning member and the collar member can be fitted into each other easily, and also the held portion can be held by the second holding portion. Therefore, the ease of assembly of the cushioning device can be improved.

In addition, in the case where the collar member attaching portion formed to be arced is fitted into the fitting recess in the side surface of the cylindrical collar member, the number of components can be reduced as compared with the case where, for example, the collar member attaching portion of the cushioning member is fitted into the cushioning member holding portion of the collar member by use of a separate member. Accordingly, the cushioning device can be reduced in weight and can be produced at lower cost.

In an embodiment of the present invention, a gap for improving a vibration-damping property may be provided between the fitting recess and the collar member attaching portion.

According to this structure, the vibration-damping property of the cushioning device can be further improved. This will be described in more detail. The gap for improving the vibration-damping property is provided in the state where the collar member attaching portion formed to be arced is held by the fitting recess. Therefore, no colliding noise is generated by the collar member attaching portion and the fitting recess. The vibration input via the collar member can be absorbed by the gap. The gap can also block the heat transmission.

In an embodiment of the present invention, the collar member may include collar member components assembled together, the collar member components each having a generally L-shaped cross-section and including a thick ring portion which defines the tightening member insertion portion and has an appropriate thickness in a diametric direction of the collar member and also including a disc-shaped flange portion protruding in a diametrically outer direction from one of a top end and a bottom end of the thick ring portion, the collar member components being assembled such that the flange portions are located on the outer side and end portions of the thick ring portions face each other.

According to this structure, the product reliability of the cushioning device having a high vibration-damping property can be improved. This will be described in more detail. The collar member includes collar member components assembled together. The collar member components each have a generally L-shaped cross-section, and each include a thick ring portion which defines the tightening member insertion portion and has an appropriate thickness in the diametric direction of the collar member and also include a disc-shaped flange portion protruding in a diametrically outer direction from one of a top end and a bottom end of the thick ring portion. The collar member components are assembled such that the flange portions are located on the outer side and end portions of the thick ring portions face each other. Owing to this, a space enclosed by the thick ring portions facing each other and the flange portions can form the fitting recess.

In the assembled state, the end portions of the thick ring portions of the collar member components face each other. Therefore, during a step of inserting the tightening member into the tightening member insertion portion of the assembled collar member and thus securing the tightening member to the vibration target member, the fitting recess defined by the flanges can be prevented from being deformed due to the tightening pressure of the tightening member. Accordingly, the gap for improving the vibration-damping property can be formed without fail between the collar member attaching portion and the fitting recess. The vibration input via the collar member can be absorbed by the gap without causing a colliding noise at the collar member attaching portion or the fitting recess. In addition, transmission of heat can be blocked by the gap.

In an embodiment of the present invention, the collar member components included in the collar member may be a vibration target member-side component provided on the side of the vibration target member and a connection target member-side component provided on the side of the connection target member; and the flange portion of the vibration target member-side component may have a large-diameter flange portion which has a large diameter and is contactable with the second holding portion.

The large-diameter flange portion included in the flange portion of the vibration target member-side component can be the flange portion itself of the vibration target member-side component which is formed to have a large diameter, or a large-diameter flange portion secured to the flange portion of the vibration target member-side component.

Owing to this structure, a cushioning device having a higher vibration-damping property can be provided.

This will be described in more detail. The flange portion of the vibration target member-side component, on the side of the vibration target member, among the collar member components included in the collar member has a large-diameter flange portion which has a large diameter and is contactable with the second holding portion. Owing to this, even when the joining member to be joined to the connection target member is displaced toward the vibration target member due to a large amplitude, the large-diameter flange portion included in the flange portion of the vibration target member-side component contacts the second holding portion and thus can prevent the second holding portion from directly contacting the vibration target member. Accordingly, the vibration-damping property can be provided without fail even against a large vibration caused by, for example, resonance or the like.

The present invention is also directed to a metal cover formed of one or a plurality of aluminum alloy plates so as to have a three-dimensional shape, the one or the plurality of aluminum alloy plates having a corrugated shape extending in directions crossing each other. The corrugated shape in a squashing target portion is squashed to be generally flat; one of the directions crossing each other is defined as a direction crossing a main ridgeline portion forming the three-dimensional shape; any of the above-described cushioning devices is used; and a vibration target member is formed of an internal combustion engine and/or an exhaust path thereof, and a first holding portion holds the squashing target portion.

According to the present invention, a metal cover which can suppress the heat radiation and the vibration transmission from, for example, an internal combustion engine of an automobile and/or an exhaust path thereof can be provided.

This will be described in more detail. For example, a metal cover formed of a material having an appropriate heat-resistant performance is attached by use of the above-described cushioning device having a high vibration-damping property. Therefore, the heat radiation from an internal combustion engine and/or an exhaust path thereof, which are heat sources, can be prevented. In addition, the vibration transmission from the internal combustion engine and/or the exhaust path thereof, which are also vibration sources, to the metal cover can be prevented.

Accordingly, as compared with the case where, for example, the metal cover itself resonates with the vibration input from the vibration source, the metal cover can be attached with a high vibration-damping property.

The metal cover is formed of one or a plurality of aluminum alloy plates having a corrugated shape extending in directions crossing each other. Therefore, the metal cover is highly deformable. Thus, even in the case where, for example, the internal combustion engine and/or the exhaust path thereof has a complicated shape, the metal cover can be shaped in accordance therewith. Since the metal cover shaped in accordance with those shapes can be attached, the heat radiation from the internal combustion engine and/or the exhaust path thereof can be prevented with more certainty.

In an embodiment of the present invention, the directions crossing each other are a first direction and a second direction crossing each other perpendicularly. The corrugated shape is such that ridges and troughs each extending in the first direction are alternately located in the second direction; the ridges include first rising portions and second rising potions rising from the troughs and alternately located in the first direction; the troughs include flat portions and concaved portions alternately located in the first direction; the first rising portions each include a pair of side walls rising from the troughs in an inverted trapezoidal shape and a relatively flat apex connecting tips of the side walls to each other, and the first rising portion is curved inward so that a top portion of the first rising portion is wider than a base portion thereof; the concaved portions each include a pair of side walls falling from the second rising portions and a recessed portion connecting tips of the side walls to each other; and the first rising portions and the flat portions are intermittently continuous in the second direction, and the second rising portions and the concaved portions are intermittently continuous in the second direction.

According to this structure, the shape processability of the metal cover is further improved. Thus, the metal cover can be easily formed into a shape more matching the shapes of the internal combustion engine and/or the exhaust path thereof. As a result, the heat radiation from the internal combustion engine and/or the exhaust path can be prevented with more certainty.

Advantageous Effects of Invention

According to the present invention, a cushioning device having a stable and superb vibration-damping property and a metal cover attachable by use of the cushioning device can be provided.

BRIEF DESCRIPTION OF DRAWINGS

FIGS. 7A, 7B, 7C illustrate a grommet.

DESCRIPTION OF EMBODIMENTS

An embodiment of the present invention will be described with reference to the drawings.

Figure 1:
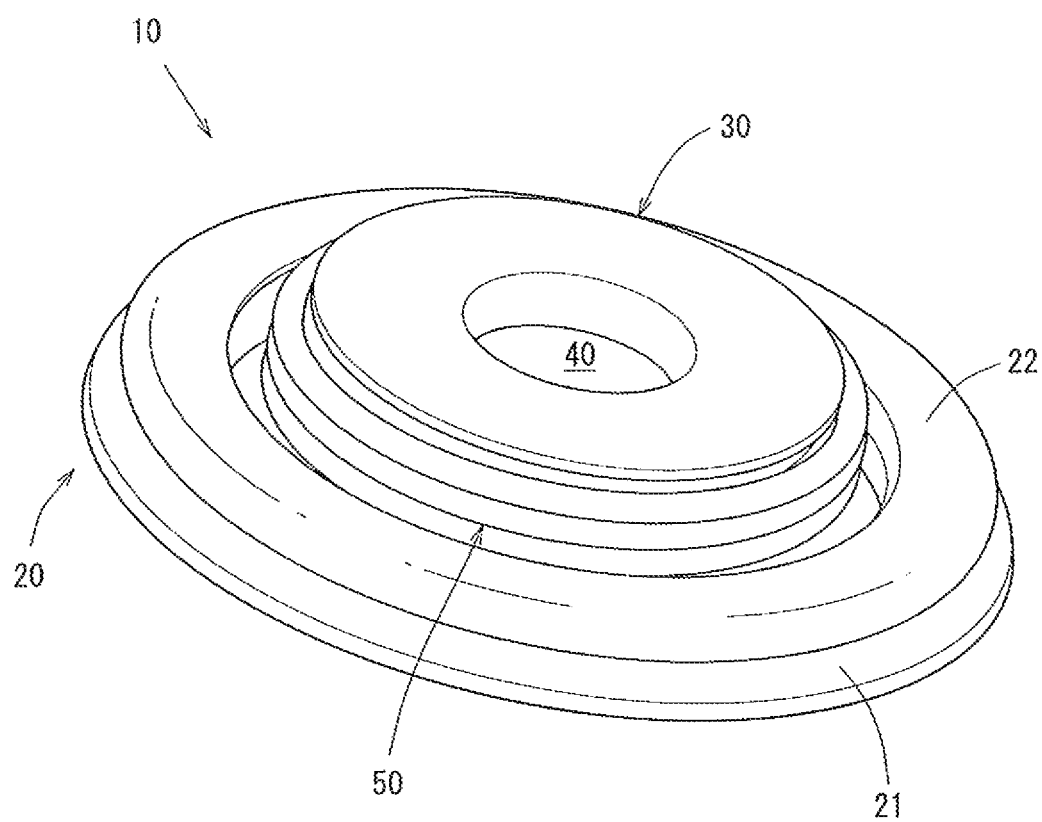
FIG. 1 is an isometric view of a cushioning device as seen from a bottom surface thereof.
Figure 2:
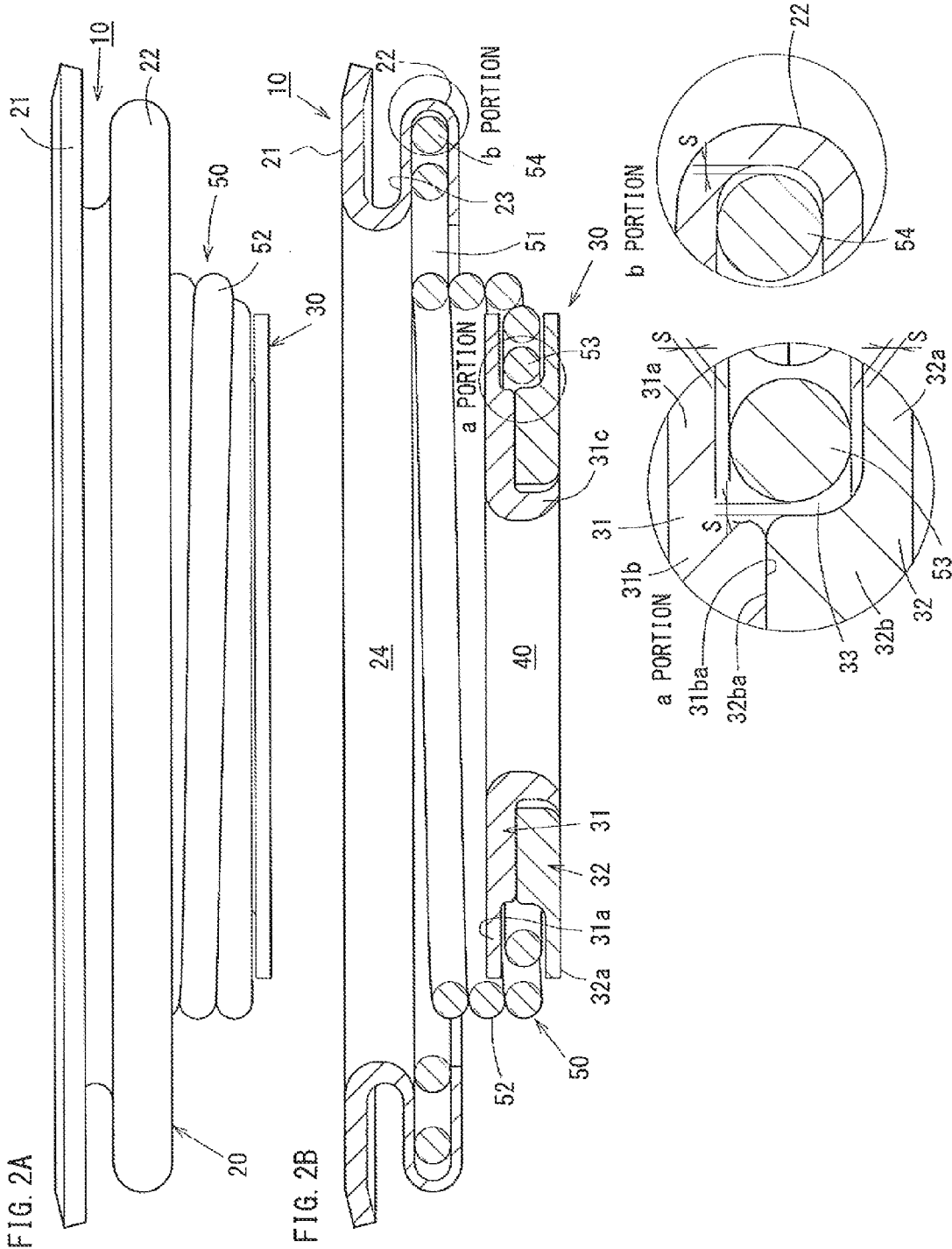
FIGS. 2A and 2B illustrate the cushioning device.
Figure 3:
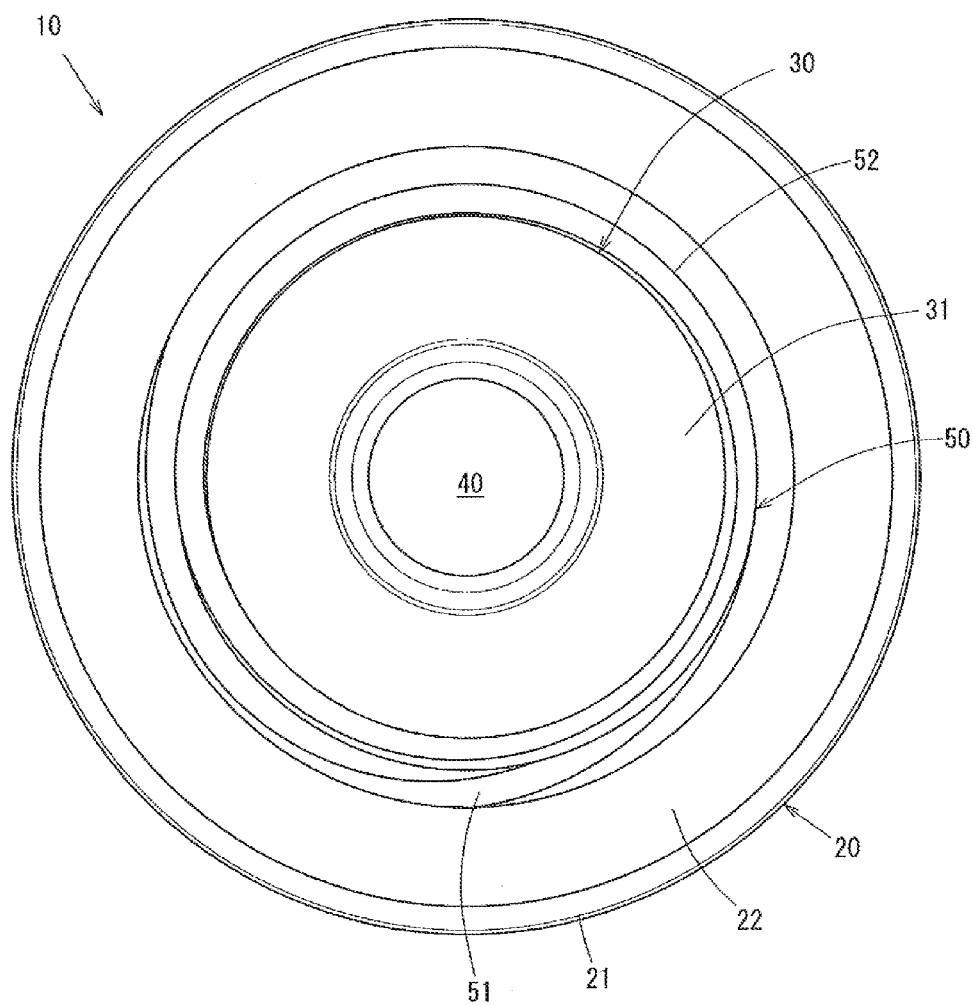
FIG. 3 is a bottom view of the cushioning device.

FIG. 1 is an isometric view of a cushioning device 10 in this example as seen from a bottom surface thereof, and FIG. 2 illustrates the cushioning device 10. FIG. 3 is a bottom view of the cushioning device 10. FIG. 2($a$) is a front view of the cushioning device 10, and FIG. 2($b$) is a cross-sectional view of the cushioning device 10.

Figure 4A:
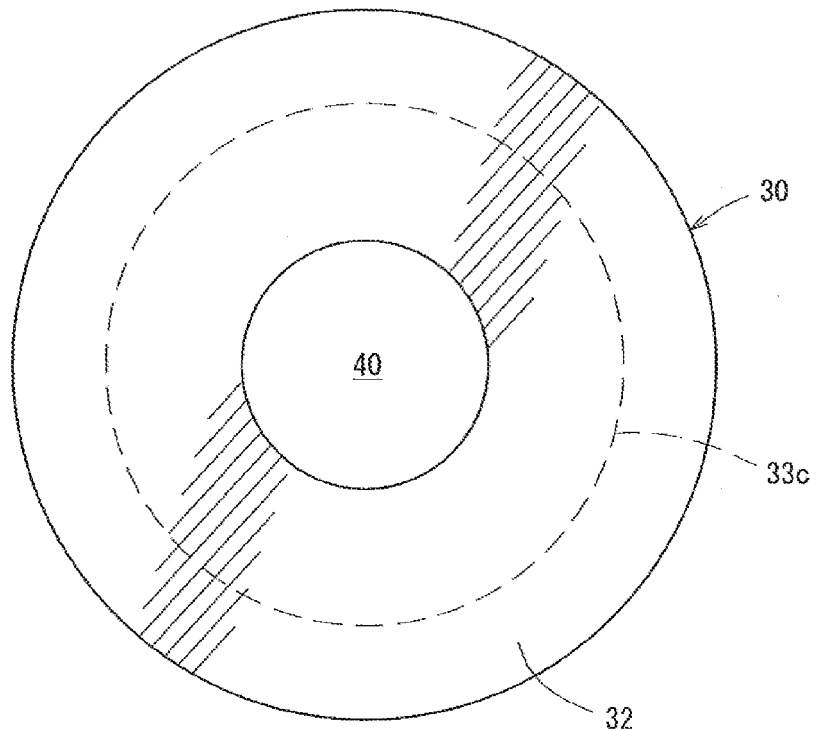
FIGS. 4A, 4B, and 4C illustrate a collar member.
Figure 4B:
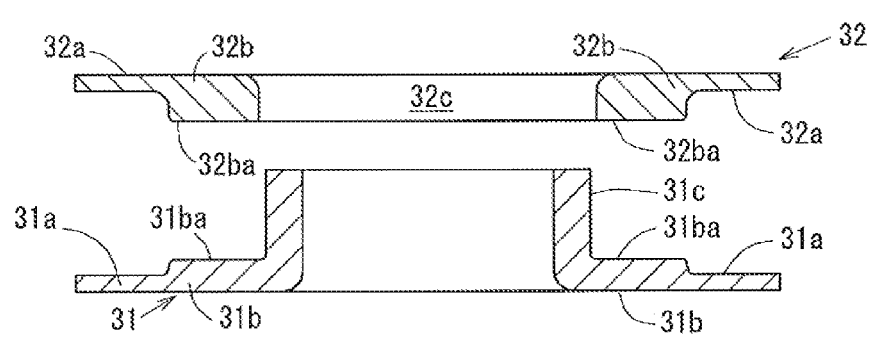
Figure 4C:
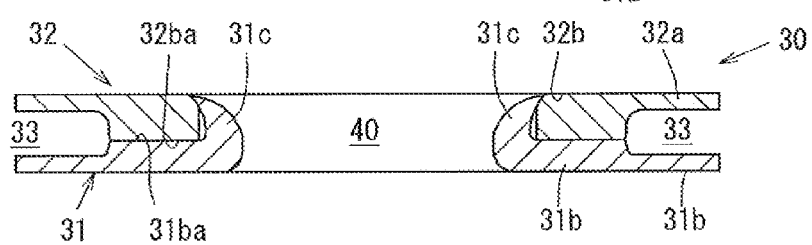
Figure 5A:
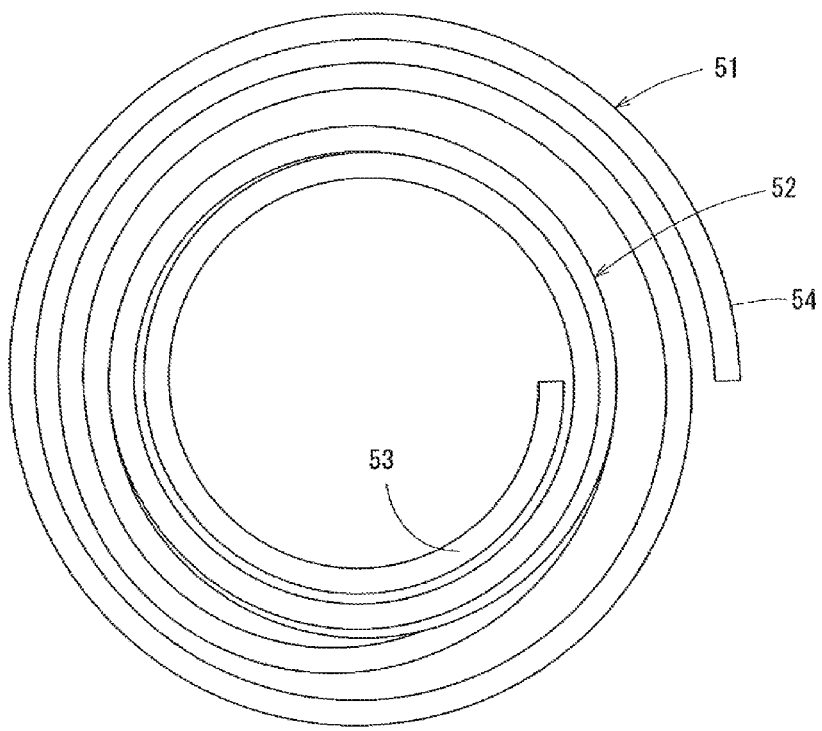
FIGS. 5A and 5B illustrate a multi-stage coil spiral spring.
Figure 5B:
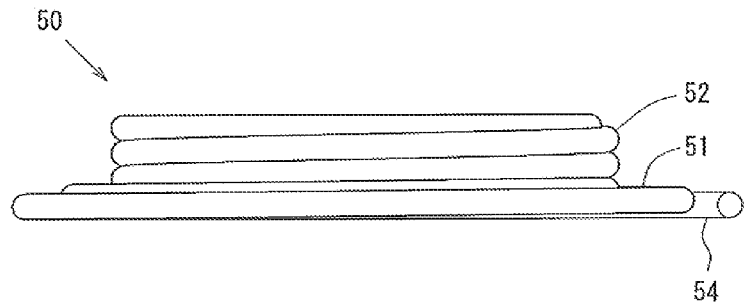
Figure 6A:
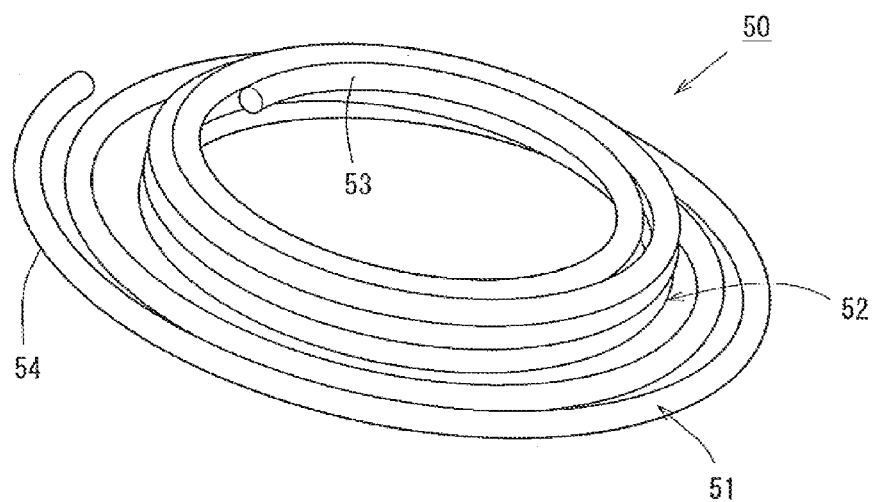
FIGS. 6A and 6B illustrate the multi-stage coil spiral spring.
Figure 6B:
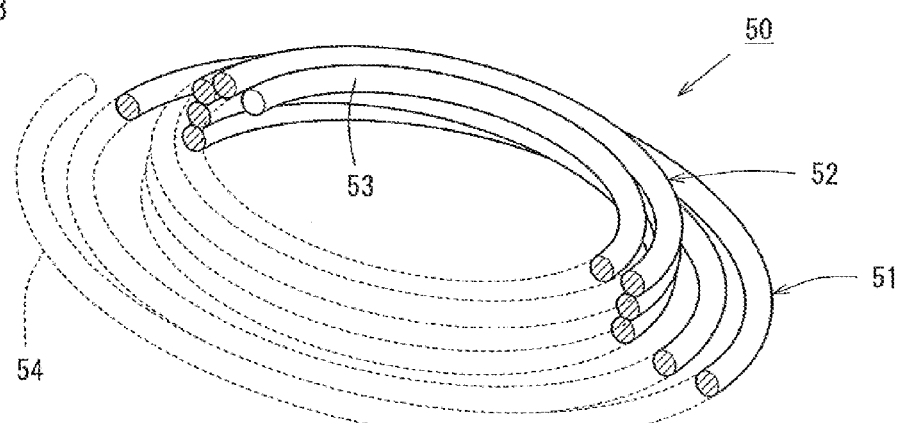

FIG. 4 illustrates a collar member 30, and FIG. 5 and FIG. 6 illustrate a multi-stage coiled and spiral spring 50. FIG. 7 illustrates a grommet 20 in this embodiment.

FIG. 4($a$) is a plan view of the collar member 30 of the cushioning device 10, FIG. 4($b$) is an exploded cross-sectional view of the collar member 30, and FIG. 4($c$) is a cross-sectional view of the collar member 30.

FIG. 5($a$) is a bottom view of the multi-stage coiled and spiral spring 50 of the cushioning device 10, and FIG. 5($b$) is a front view of the multi-stage coiled and spiral spring 50. FIG. 6($a$) is an isometric view of the multi-stage coiled and spiral spring 50 as seen from the bottom surface thereof, and FIG. 6($b$) is an isometric view of the multi-stage coiled and spiral spring 50 as seen from a bottom surface thereof, in which the front side thereof is shown as being transparent. FIG. 7($a$) is a plan view of the grommet 20, FIG. 7($b$) is a cross-sectional view of the grommet 20, and FIG. 7($c$) is a bottom view of the grommet 20.

Figure 8:
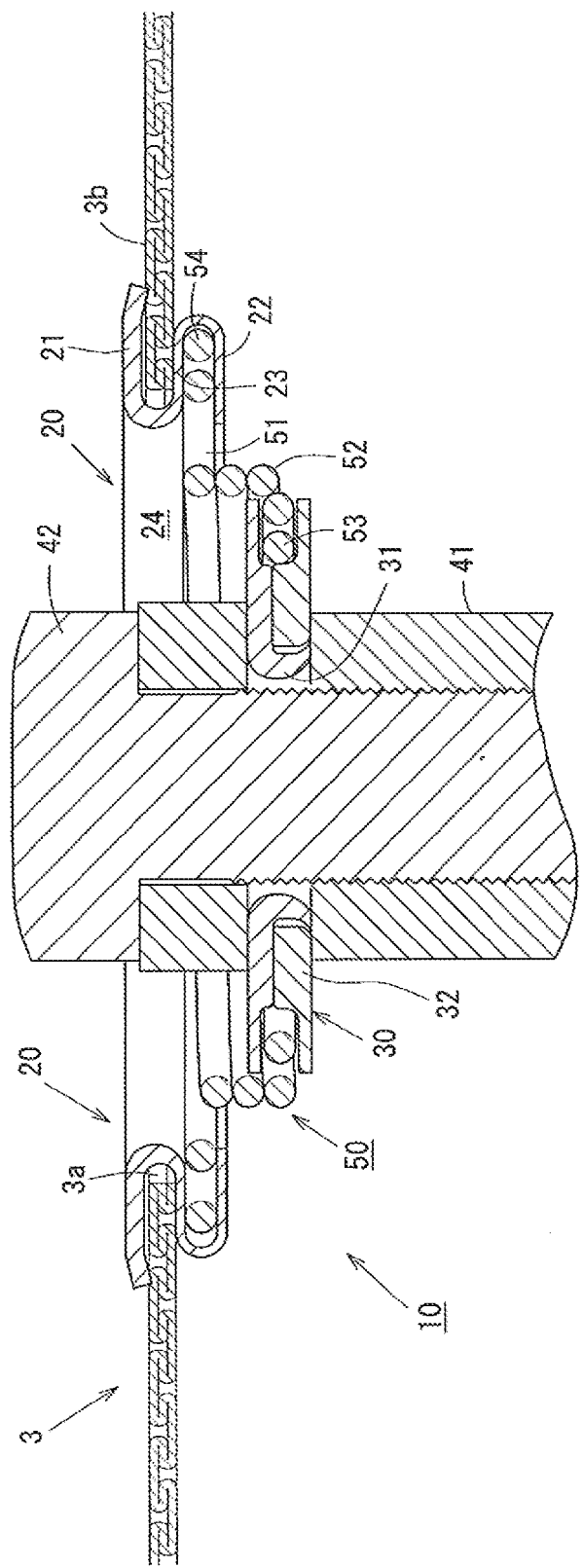
FIG. 8 is a cross-sectional view of the cushioning device in an attached state.
Figure 9A:
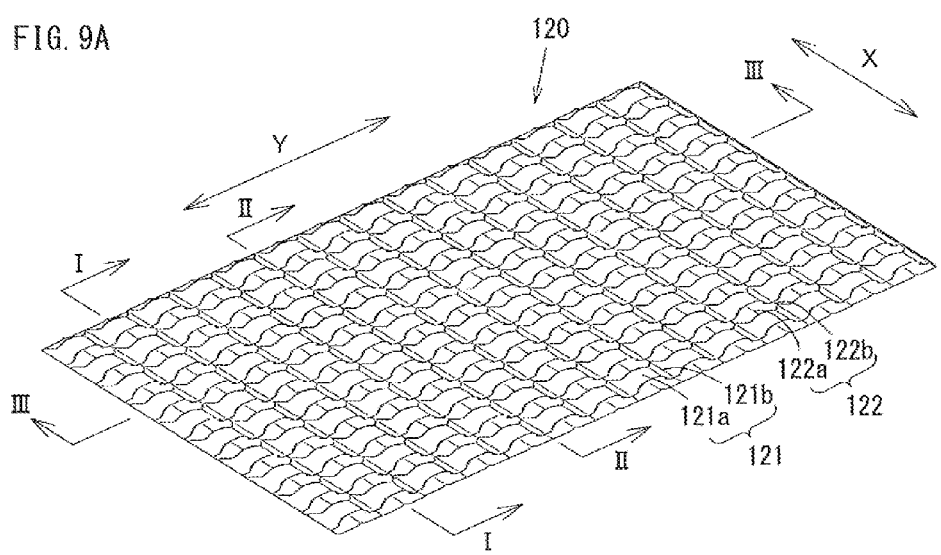
FIGS. 9A, 9B, 9C, and 9D illustrate a corrugated plate included in a heat insulator.
Figure 9B:
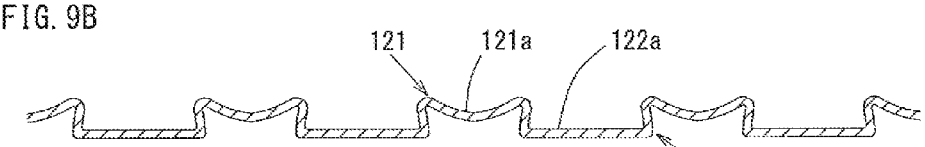
Figure 9C:
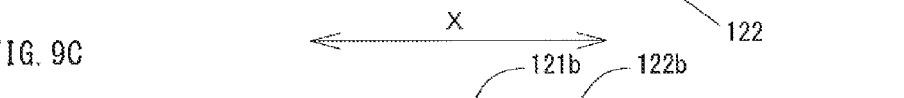
Figure 9D:
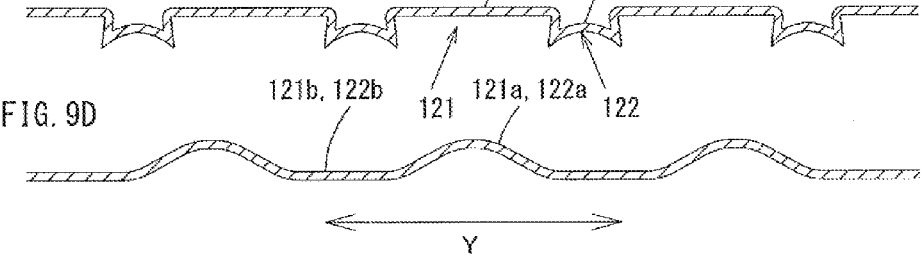
Figure 10:
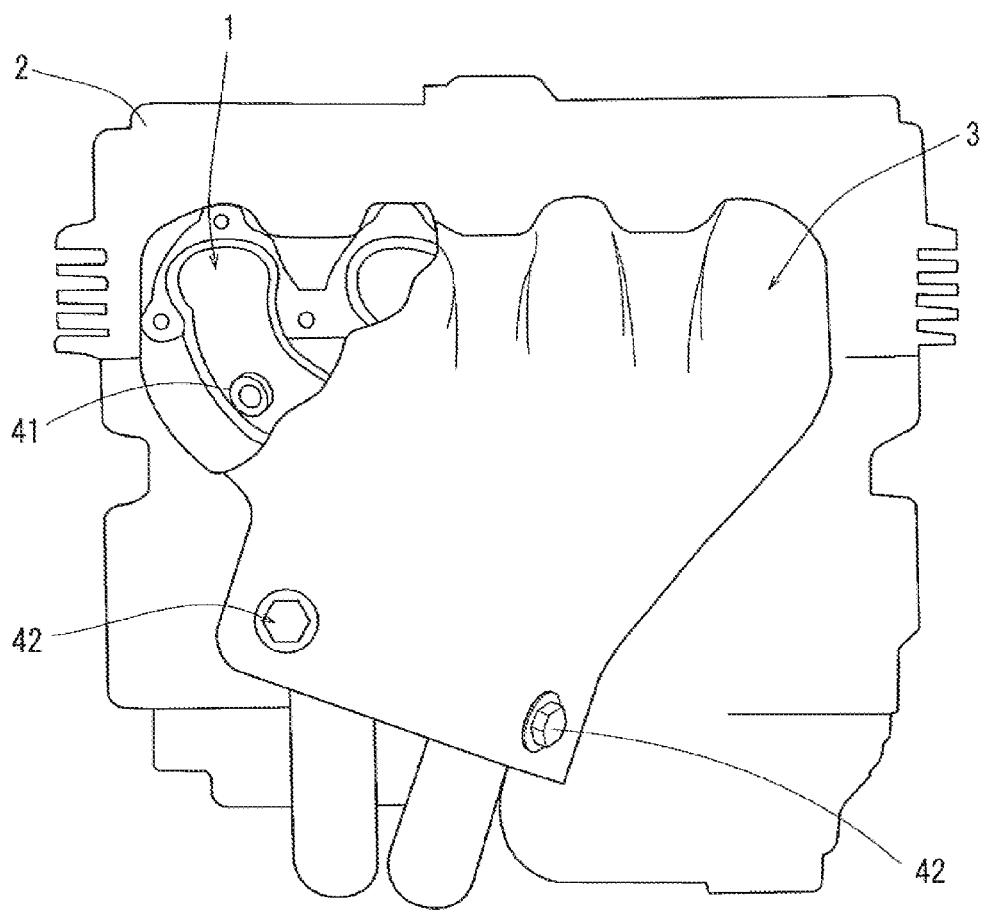
FIG. 10 is a schematic front view of the cushioning device in an attached state.

FIG. 8 is a cross-sectional view of the cushioning device 10 in an attached state, and FIG. 9 illustrates a corrugated sheet 120 included in a heat insulator 3. FIG. 10 is a schematic front view of the cushioning device 10 in an attached state.

FIG. 9($a$) is an isometric view of the corrugated sheet 120, and FIG. 9($b$) is a cross-sectional view of the corrugated sheet 120 taken along line I-I in FIG. 9($a$). FIG. 9($c$) is a cross-sectional view of the corrugated sheet 120 taken along line II-II in FIG. 9($a$), and FIG. 9($d$) is a cross-sectional view of the corrugated sheet 120 taken along line III-III in FIG. 9($a$).

As described above in the Background Art section of this specification, the engine 2 of a vehicle of an automobile or the like is provided with an exhaust manifold 1 attached on a side surface thereof in order to discharge combustion exhaust gas (see FIG. 10). The exhaust manifold 1 is covered with the heat insulator 3.

The cushioning device 10 according to the present invention is of a floating mount structure for attaching the heat insulator 3 to the exhaust manifold 1, and includes the multi-stage coiled and spiral spring 50 for cushioning the vibration, the grommet 20 and the collar member 30.

The collar member 30 has a cylindrical shape which is low as compared with the diameter thereof and is formed of an iron-based material such as SPCC or the like. As shown in FIG. 4(a), the collar member 30 has a bolt hole 40 at a central position thereof as seen in a plan view for allowing an attaching bolt 42 to pass therethrough. The collar member 30 has a fitting recess 33 in a side surface thereof 20, for allowing a collar member attaching portion 53 of the multi-stage coiled and spiral spring 50 described later to fit thereinto.

The collar member 30 includes an upper collar 31 which is convexed downward and a lower collar 32 which is caulked with the upper collar 31.

In more detail, the upper collar 31 includes a ring portion 31a located in a diametrically outer part thereof, an annular thick portion 31b located diametrically inner to the ring portion 31a, and a fitting cylinder portion 31c protruding upward from an inner circumferential edge of the thick portion 31b. The ring portion 31a, the thick portion 31b and the fitting cylinder portion 31c are integrated together. The thick portion 31b has a bottom surface 31ba.

The lower collar 32 includes a ring portion 32a located on the bottom side and in a diametrically outer part thereof so as to correspond to the ring portion 31a, and an annular thick portion 32b. A fitting opening 32c is defined by an inner circumferential edge of the annular thick portion 32b and allows the fitting cylinder portion 31c to fit thereinto. The thick portion 32b has a top surface 32ba. The ring portions 31a and 32a are respectively thinner than the thick portions 31b and 32b by approximately a radius of a wiring member which forms the multi-stage coiled and spiral spring 50 described later and has a circular cross-section.

The upper collar 31 and the lower collar 32 having such a structure are integrated together as follows. The bottom surface 31ba of the thick portion 31b of the upper collar 31 and the top surface 32ba of the thick portion 32b of the lower collar 32 are located to face each other, and the fitting cylinder portion 31c inserted into the fitting opening 32c is caulked in the diametrically outer direction. In this state, the ring portion 31a of the upper collar 31 and the ring portion 32a of the lower collar 32 form the fitting recess 33 which is annular as seen in a plan view and is concaved in the diametrically inner direction from the side surface of the cylindrical collar member 30.

The fitting recess 33 is formed by the ring portions 31a and 32a which face each other and are respectively thinner than the thick portions 31b and 32b by approximately the radius of the wiring member which forms the multi-stage coiled and spiral spring 50. Therefore, the fitting recess 33 is a concaved portion which is annular as seen in a plan view and has a height slightly larger than a diameter of the wiring member which forms the multi-stage coiled and spiral spring 50.

The multi-stage coiled and spiral spring 50 is formed by winding the wiring member having a circular cross-section, and includes a diametrically outer spiral portion 51 and a diametrically inner multi-stage coiled portion 52.

In more detail, the multi-stage coiled and spiral spring 50 includes the spiral portion 51 wound inner from the diametrically outer side while the position thereof in a height direction is gradually changed, and the multi-stage coiled portion 52 which is continued from a diametrically inner end of the spiral portion 51 and is wound in a cylindrical manner. Owing to such a structure, the spiral portion 51 and the multi-stage coiled portion 52, although being formed of the same wiring member having a circular cross-section, have different pitches and thus have different spring constants. Namely, by changing the manner of winding from the spiral manner to the cylindrical manner, the multi-stage coiled and spiral spring 50 formed by winding one continuous wiring member having a circular cross-section has two different spring constants. The multi-stage coiled and spiral spring 50 includes the collar member attaching portion 53 formed at an end of the multi-stage coiled portion 52 and also a held portion 54, which is held by a coupling portion 23 of the grommet 20 described later, on the diametrically outer side of the spiral portion 51.

The spiral portion 51 of the multi-stage coiled and spiral spring 50 will be described in more detail. The spiral portion 51 has the position thereof in the height direction (up-down direction in FIG. 5 (b)) gradually changed along the spiral direction and has three spiral winds.

As described above, the held portion 54 which is arcked is provided at the diametrically outer side of the spiral shape of the multi-stage coiled and spiral spring 50, and the multi-stage coiled portion 52 is formed continuously from a center-side end of the spiral shape of the multi-stage coiled and spiral spring 50.

As described above, the multi-stage coiled portion 52 is continuous from the diametrically inner end of the spiral portion 51, and is wound at a narrow pitch in the height direction and with an equal winding diameter. At the end thereof, the collar member attaching portion 53 for attaching the multi-stage coiled and spiral spring 50 to the fitting recess 33 is provided.

The collar member attaching portion 53 and the held portion 54 both have an arcked shape having a central angle of 270 degrees, which is ¾ of a circle from an end thereof (see FIG. 5(a)). A circle defined by an inner circumference of the collar member attaching portion 53 has a diameter slightly larger, specifically by about 0.2 mm, than that of a circle 33c defined by a circumferential surface of the fitting recess 33 of the collar member 30. Accordingly, a gap S for improving the vibration-damping property is formed between the inner circumference of the collar member attaching portion 53 and the circle 33c defined by the circumferential surface of the fitting recess 33 (see an enlarged view of "a" portion in FIG. 2(b).

The multi-stage coiled and spiral spring 50 is formed of a wiring member which is formed of a stainless steel such as SUS304 or the like.

The multi-stage coiled and spiral spring 50 includes the spiral portion 51 and the multi-stage coiled portion 52. In accordance with various conditions of use including the frequency band or the amplitude of the vibration to be damped, the temperature of use and the like, the wiring member may have a cross-section of an elliptical shape, generally rectangular shape, or any other optional shape of a closed curved surface. The shape of the cross-section of the wiring member may be appropriately selectable as well as the diameter, the material or the number of winds of the wiring member.

The grommet 20 includes a first holding portion 21 for holding the heat insulator 3, a second holding portion 22 for holding the multi-stage coiled and spiral spring 50, and the coupling portion 23 for coupling the first holding portion 21 and the second holding portion 22 to each other. The grommet 20 has an insertion hole 24 at a central position as seen in a plan view. The grommet 20 has an annular shape having an S-shaped cross-section.

This will be described in more detail. The first holding portion 21 for holding the heat insulator 3 on a diametrically outer side has an end having an inverted-J-shaped cross-section which is opened outward as follows. A portion of a prescribed length in a radial direction, which is extended internally from an outer circumferential edge of the annular metal plate, is extended downward in FIG. 7 and then is returned externally from the diametrically inner side. The first holding portion 21 is formed to have a thickness which is sufficient to hold the heat insulator 3 described later.

The second holding portion 22 for holding the multi-stage coiled and spiral spring 50 on the diametrically inner side has an end having an inverted-J-shaped cross-section which is opened inward as follows. A portion of a prescribed length in the radial direction, which is extended externally from the diametrically inner side of the annular metal plate, is extended upward in FIG. 7 and then is returned internally from the diametrically outer side.

The second holding portion 22 is formed to have a thickness which is sufficient to hold the multi-stage coiled and spiral spring 50. In addition, there is a slight gap S between the outer circumference of the held portion 54 of the multi-stage coiled and spiral spring 50 and the inner circumferential surface of the inverted-J-shaped second holding portion 22 (see an enlarged view of "b" portion in FIG. 2(b)).

The coupling portion 23 is formed to be bent between the first holding portion 21 and the second holding portion 22, and couples a bottom end on the diametrically inner side of the first holding portion 21 having the inverted-J-shaped cross-section which is opened outward and a top end on the diametrically outer side of the second holding portion 22 having the inverted-J-shaped cross-section which is opened inward. The second holding portion 22, the coupling portion 23, and the first holding portion 21 are located in this order from the side of a bolt boss 41 provided on the exhaust manifold 1.

The above-described cushioning device 10 is formed by assembling the collar member 30, the multi-stage coiled and spiral spring 50, and the grommet 20 structured as described above. In more detail, the collar member attaching portion 53 of the multi-stage coiled and spiral spring 50 is fitted into the fitting recess 33 of the collar member 30, and thus the collar member 30 and the multi-stage coiled and spiral spring 50 are assembled together. At this point, as described above, the gap S is formed between the circle 33c defined by the circumferential surface of the fitting recess 33 of the collar member 30 and the inner circumference of the collar member attaching portion 53 of the multi-stage coiled and spiral spring 50, and the collar member attaching portion 53 can be wound along a range of ¾ of the circle 33c defined by the circumferential surface of the fitting recess 33.

The held portion 54 of the spiral portion 51 of the multi-stage coiled and spiral spring 50 is fitted into the second holding portion 22 of the grommet 20, and thus the grommet 20 and the multi-stage coiled and spiral spring 50 are assembled together. At this point, as described above, the gap S is formed between the inner circumferential surface of the second holding portion 22 of the grommet 20 and the outer circumference of the held portion 54 of the multi-stage coiled and spiral spring 50, and the held portion 54 is located along a range of ¾ of the inner circumferential surface of the second holding portion 22.

As shown in FIG. 2(b), in order to locate the multi-stage coiled and spiral spring 50 between the grommet 20 and the collar member 30 such that the held portion 54 on the diametrically outer side is located at a higher level (upward direction in FIG. 2(b)) than the collar member attaching portion 53 on the diametrically inner side, the second holding portion 22 for holding the held portion 54 is located at a higher level than the collar member 30 engaged with the collar member attaching portion 53 at the fitting recess 33.

As shown in FIG. 8, the cushioning device 10 having such a structure is attached to attaching holes 3a of the heat insulator 3 and secured to the bolt boss 41 formed on the exhaust manifold 1 by the attaching bolt 42 screwed into the bolt boss 41.

As shown in FIG. 10, the heat insulator 3 is formed so as to cover the exhaust manifold 1 attached to the side surface of the engine 2, and is secured to a plurality of the bolt bosses 41 provided on the exhaust manifold 1 via the cushioning device 10 by the attaching bolts 42.

The heat insulator 3 having such a shape that covers the exhaust manifold 1 is conventionally formed of an aluminum-plated steel plate but is today formed of a corrugated sheet 120 put into a prescribed shape. The corrugated sheet 120 is formed of a light metal material, for example, aluminum and is corrugated in two directions perpendicular to each other (see FIG. 9).

This will be described in more detail. The corrugated sheet 120 is a corrugated aluminum plate. As shown in FIG. 9(b) and FIG. 9(c), the corrugated sheet 120 includes ridges 121 and troughs 122 alternately and continuously located in an X direction. As shown in FIG. 9 (d), in a Y direction, the ridges 121 and the troughs 122 each have apexes (121a, 122a) and bottoms (121b, 122b) located at a certain interval.

The ridges 121 and the troughs 122 each have wider portions and narrow portions alternately located at a certain interval in the X direction to form a corrugated shape.

In more detail, in the corrugated shape of the corrugated sheet 120, the ridges 121 extending in the Y direction and the troughs 122 extending in the Y direction are alternately located in the X direction.

In the Y direction, the ridges 121 include the apexes 121a and the bottoms 121b, both rising from the troughs 122, located alternately. In the Y direction, the troughs 122 include flat portions 122a as the apexes and concaved portions 122b as the bottoms located alternately.

The apexes 121a each include a pair of side walls rising from the troughs 122 in an inverted trapezoidal shape and a relatively flat apex portion connecting tips of the side walls to each other. Each apex 121a is curved inward so that a top portion of the apex 121a is wider than a base portion thereof.

The concaved portions 122b each include a pair of side walls falling from the bottoms 121b and a recessed portion connecting tips of the side walls to each other. The apexes 121a and flat portions 122a are intermittently continuous in the X direction, and the bottoms 121b and the concaved portions 122b are intermittently continuous in the X direction.

In the heat insulator 3 formed by putting the corrugated sheet 120 into a prescribed shape, the attaching holes 3a are formed at positions corresponding to the bolt bosses 41 provided on the exhaust manifold 1. The corrugated shape is squashed in the vicinity of the attaching holes 3a to form generally flat squashed portions 3b, and the squashed portions 3b are held by the first holding portion 21.

The heat insulator 3 has a three-dimensional shape. One of the two directions perpendicular to each other of the corrugated shape is defined as a direction crossing a main ridgeline portion forming the three-dimensional shape.

This will be described in more detail. The heat insulator 3 is formed to have a three-dimensional shape along the three-dimensional external shape of the exhaust manifold 1 as described above. Therefore, the heat insulator 3 has one or a plurality of ridgeline portions, which are bending portions. In this example, the heat insulator 3 is pressed to have a shape such that a longitudinal direction of the corrugated shape crosses a main ridgeline portion among these plurality of ridgeline portions.

The "main ridgeline portion" is a portion in which folding portions having a relatively large radius of curvature characterizing the overall shape of the heat insulator 3 are continuous. Namely, among various large and small folding portions of the heat insulator 3, a folding portion which is relatively long and thus substantially determines the external shape of the heat insulator 3 is the "main ridgeline portion".

When a heat insulator 3 is attached to the exhaust manifold 1, the heat insulator 3 vibrates because the vibration of the exhaust manifold 1 is transmitted to the heat insulator 3. When the heat insulator 3 vibrates by the vibration of the exhaust manifold 1, portions of the heat insulator 3 on both of two sides of the main ridgeline portion significantly vibrate like butterfly wings. When such a vibration is generated, portions of the heat insulator 3 in the vicinity of the main ridgeline portion are liable to be weakened by metal fatigue and cracked due to the repeated bending.

By contrast, in the case of the heat insulator 3 in this example, one direction of the corrugated shape of the heat insulator 3 is defined as a direction crossing the main ridgeline portion, preferably as a direction perpendicularly crossing the main ridgeline portion. Therefore, the corrugated shape acts as ribs against the vibration centered around the ridgeline portion. Thus, the heat insulator 3 can be suppressed from vibrating and thus prevented from cracking. As a result, the quality of the heat insulator 3 can be significantly improved.

Owing to such a structure, as shown in FIG. 8, the heat insulator 3 can be secured to the bolt boss 41 provided on the exhaust manifold 1 via the cushioning device 10 attached to the attaching holes 3*a* formed in the heat insulator 3.

Figure 11:
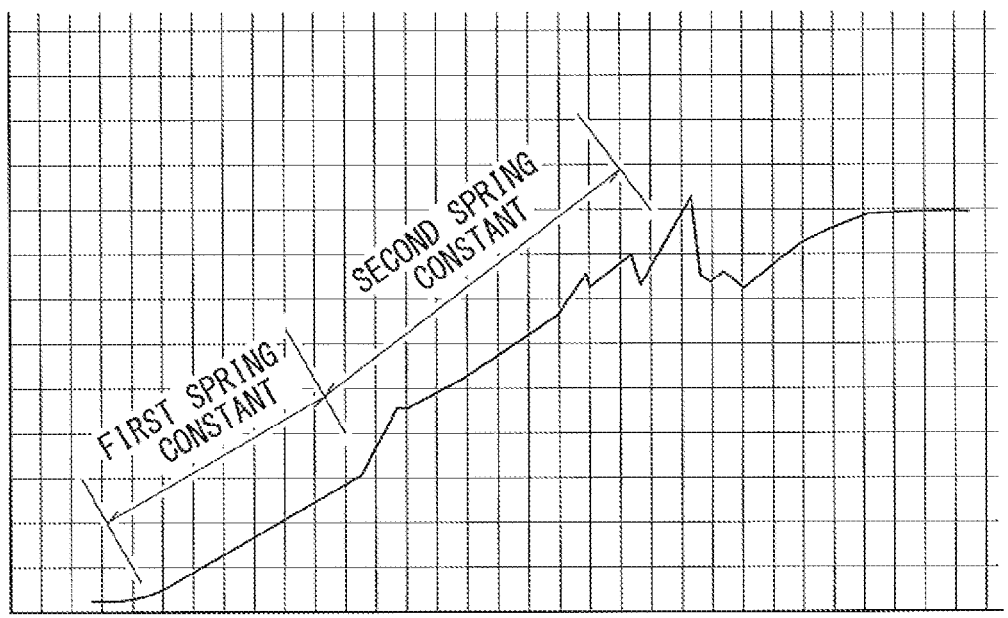
FIG. 11 is a graph regarding a spring constant confirmation test performed on the multi-stage coiled and spiral spring.
Figure 12:
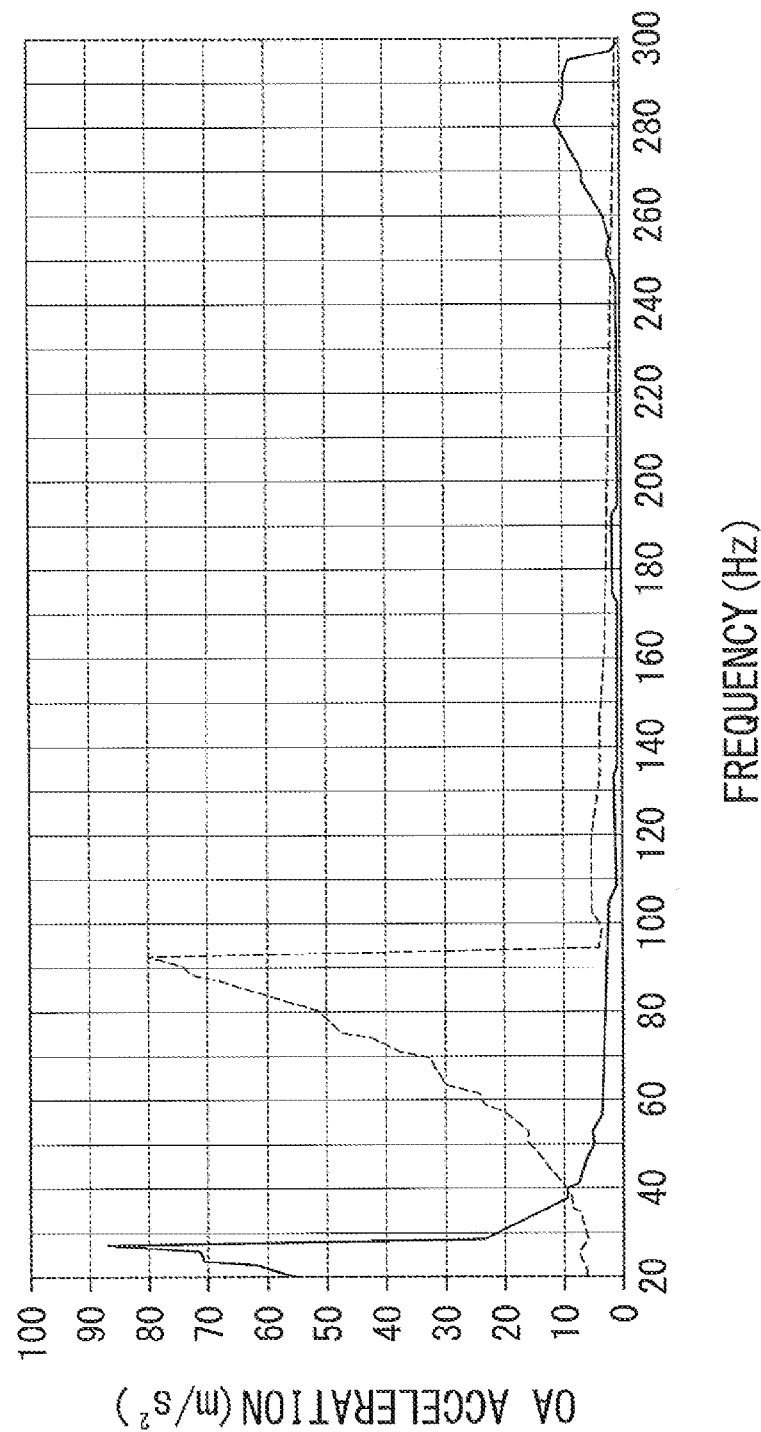
FIG. 12 is a graph regarding an effect confirmation test performed on the cushioning device.
Figure 13:
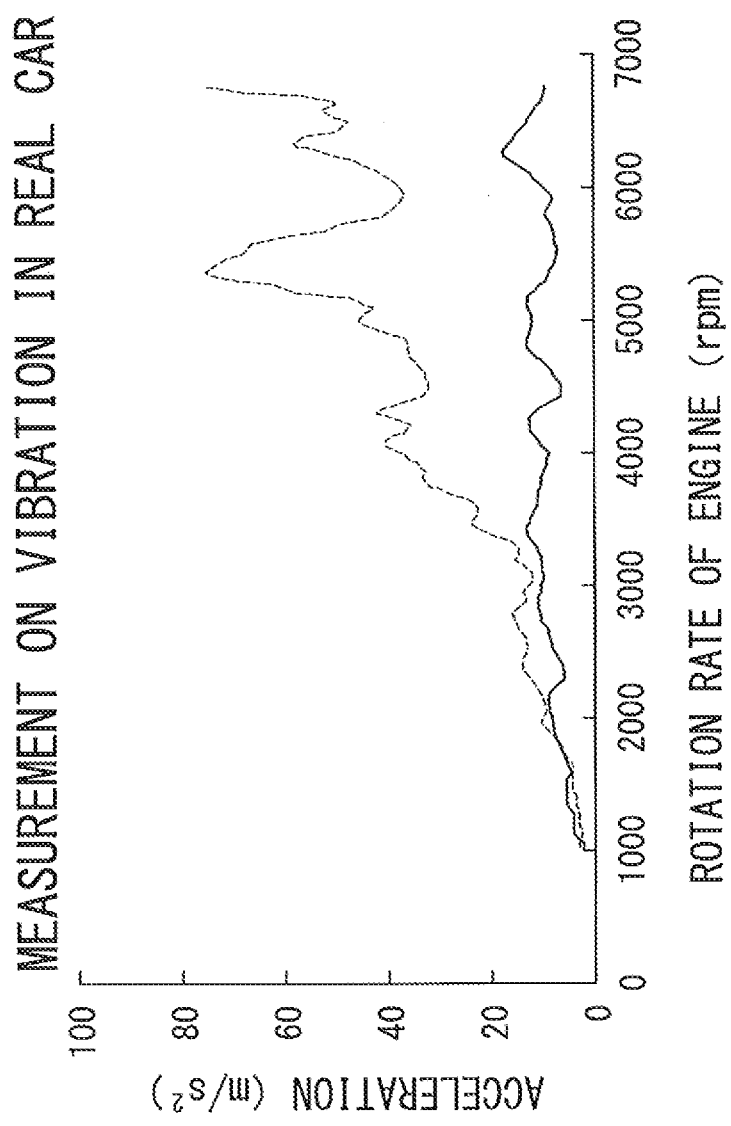
FIG. 13 is a graph regarding an effect confirmation test performed on the cushioning device.

With reference to FIG. 11, FIG. 12 and FIG. 13, effect confirmation tests performed in the state where the heat insulator 3 was secured by use of the cushioning device 10 will be described.

FIG. 11 is a graph showing the results of a spring constant confirmation test performed for confirming the spring constant of the multi-stage coiled and spiral spring 50. FIG. 12 is a graph showing the results of a resonance peak reduction confirmation test. FIG. 13 is a graph showing the results of an effect confirmation test performed in the state where the cushioning device 10 was mounted on a real vehicle.

First, the spring constant confirmation test was performed for confirming the spring constant of the multi-stage coiled and spiral spring 50 attached to the cushioning device 10. In more detail, a tensile force in the height direction is caused to act on the multi-stage coiled and spiral spring 50, and the spring constant at this point was calculated. As a result, as shown in FIG. 11, it was confirmed that a second spring constant range having a different spring constant from that of a first spring constant range appears after the displacement amount exceeds a prescribed value, namely, an apparent spring constant exists.

This is considered to occur because a load acts on the spiral portion 51 having a low spring constant up to the prescribed displacement amount and a load acts on the multi-stage coiled portion 52 having a high spring constant after the displacement amount exceeds the prescribed value.

Next, in an effect confirmation test in the case where the heat insulator 3 was secured by use of the cushioning device 10, the heat insulator 3 was secured to a vibration machine by use of the heat insulator 3. In addition, as a comparative example, the heat insulator 3 was secured to the vibration machine by use of a cushioning device including a spiral cushioning member. In FIG. 12 and FIG. 13, the solid line represents the result obtained with the cushioning device 10, and the dashed line represents the result of the comparative example.

Figure 15:
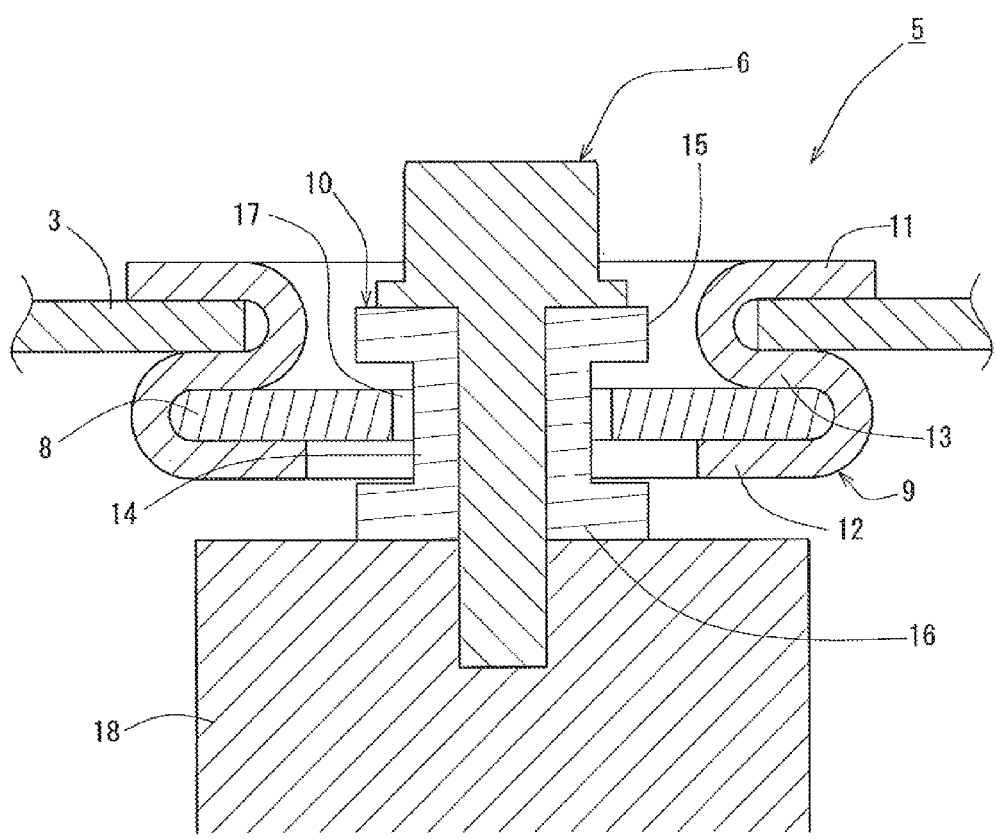
FIG. 15 is a cross-sectional view of a cushioning device in the conventional art.

As a result of the test, it was confirmed that both the cushioning device 10 and the cushioning device in the comparative example both have a higher cushioning effect of absorbing vibration than that of a conventional cushioning device as shown in, for example, FIG. 15, but that the resonance peak in the comparative example occurs in the engine normal range (see FIG. 12). The engine normal range is a frequency range of 30 to 230 Hz corresponding to the range from the idling rotation rate (850 rpm) to the full rotation rate (7000 rpm).

By contrast, it was confirmed that as shown in FIG. 12, the resonance peak of the cushioning device 10 occurs at about 27 Hz, which is lower than 30 Hz. From this, it was confirmed that the cushioning device 10 including the multi-stage coiled and spiral spring 50 does not resonate in the engine normal range and provides a higher cushioning effect in the engine normal range than, for example, a cushioning device including a spiral cushioning member which resonates in the engine normal range.

Based on the above-described results, the acceleration of the heat insulator 3 which was vibrating was measured in the case where the heat insulator 3 was mounted on a real vehicle by use of the cushioning device 10 and in the case where the heat insulator 3 was mounted on the real vehicle by use of the cushioning device in the comparative example, and the obtained accelerations was compared.

In more detail, the heat insulating 3 was mounted on an engine in a vehicle of 1300 cc by use of the cushioning device 10 and by the cushioning device in the comparative example, and the rotation rate of the engine was adjusted by an operation of the driver's foot on an accelerator pedal, and a tracking measurement of the heat insulator 3 was performed.

As a result, it was proved that as shown in FIG. 13, in the case where the cushioning device 10 is used, the vibration is suppressed more than in the case where the cushioning device in the comparative example is used, regardless of the rotation rate of the engine.

As described above, the cushioning device 10 is a device to be located between the bolt boss 41 provided on the exhaust manifold 1, which is a vibration source, and the heat insulator 3, which is a connection target. The cushioning device 10 connects the bolt boss 41 provided on the exhaust manifold 1 and the heat insulator 3 to each other and cushions transmission of a vibration from the bolt boss 41 provided on the exhaust manifold 1 to the heat insulator 3. Owing to the above-described structure, as described above, the cushioning device 10 can provide a stable and superb vibration-damping property.

This will be described in more detail. The multi-stage coiled and spiral spring 50 is formed of a wiring member having a spiral shape as seen in a plan view. The collar member attaching portion 53 for allowing the collar member 30 to be attached thereto is provided at the diametrically central part of the spiral shape as seen in a plan view, and the fitting recess 33 for holding the collar member attaching portion 53 is provided on the diametrically outer side of the collar member 30. Therefore, the vibration transmitted from the collar member 30 to the multi-stage coiled and spiral spring 50 causes the multi-stage coiled and spiral spring 50 itself formed of the wiring member having a spiral shape as seen in a plan view to make a flexural motion. Owing this flexural motion, the cushioning device 10 converts the vibration energy of the vibration transmitted from the collar member 30 into a kinetic energy of the flexure of the multi-stage coiled and spiral spring 50, and thus can suppress the vibration from being transmitted to the heat insulator 3.

Namely, the function of the gap 17 of the conventional art, which is actively formed in the axial direction and the radial direction (planar direction) between the collar member 10 and the cushioning member 8 of the cushioning device 5 such that the collar member 10 and the cushioning member 8 are loosely movable, is realized by a clearance between the winds of the wiring member of the spiral portion 51 of the multi-stage coiled and spiral spring 50. Thus, the transmission of the input vibration is suppressed; namely, a superb vibration-damping property is realized.

The collar member attaching portion 53 for allowing the collar member 30 to be attached thereto is provided at the diametrically central part of the spiral shape as seen in a plan view, and the fitting recess 33 for holding the collar member attaching portion 53 is provided on the diametrically outer side of the collar member 30. Therefore, the vibration can be suppressed from being transmitted without any collision of the multi-stage coiled and spiral spring 50 against the collar member 30. Accordingly, the vibration is suppressed from being transmitted from the collar member 30 to the multi-stage coiled and spiral spring 50 with no rattling noise caused by the collision of the multi-stage coiled and spiral spring 50 against the collar member 30. Namely, a superb vibration-damping property can be provided.

The multi-stage coiled and spiral spring 50 is formed of the wiring member having a spiral shape as seen in a plan view. Such cushioning members as products are less varied as compared with a cushioning member 8 formed by knitting metal fibers into a mesh and putting the resultant metal fiber mesh into a mat-like shape. Therefore, the multi-stage coiled and spiral spring 50 according to the present invention has a stable elasticity. Namely, the cushioning device 10 has a stable vibration-damping property.

This will be described in more detail. The multi-stage coiled and spiral spring 50 is formed of a wiring member formed by molding to have a spiral shape as seen in a plan view. Therefore, it is not necessary to handle minute inorganic fibers, which solves the difficulty in managing the fiber length in a step of cutting the inorganic fibers to a prescribed length or the difficulty in managing the size precision so that the size precision is kept high in a step of processing the fibers into final products. Owing to this, the size precision can be improved, and the precision and the stability of the vibration-damping property of the cushioning device 10 can be improved.

Accordingly, by adopting the above-described structure for the cushioning device 10, the exhaust manifold 1, which is a vibration source, and the heat insulator 3 can be connected to each other with no vibration being transmitted.

In addition, the multi-stage coiled portion 52 having a spring constant higher than that of the spiral portion 51 is provided on the diametrically inner side of the spiral shape as seen in a plan view of the multi-stage coiled and spiral spring 50. Owing to this, the cushioning device 10 can have desired cushioning characteristics. This will be described in more detail. One multi-stage coiled and spiral spring 50 having a spiral shape as seen in a plan view includes the multi-stage coiled portion 52 having a high apparent spring constant and the spiral portion 51 having a spring constant lower than that of the multi-stage coiled portion 52. Therefore, a small vibration is absorbed by the spiral portion 51 having a low spring constant, whereas a part of a large vibration which cannot be absorbed by the spiral portion 51 having a low spring constant is absorbed by the multi-stage coiled portion 52. In this manner, a more appropriate vibration absorption performance can be provided in accordance with the vibration behavior as compared with the case where, for example, both of a large vibration and a small vibration are absorbed only by the multi-stage coiled portion 52. Accordingly, the cushioning member and the cushioning device can have desired cushioning characteristics.

The multi-stage coiled portion 52 having a high apparent spring constant is wound in a generally cylindrical shape extending in a height direction; and the spiral portion 51 having a spring constant lower than that of the multi-stage coiled portion 52 is formed to have a spiral shape having a level in the height direction gradually changed along a spiral direction. Owing to this, the cushioning device 10 can have desired cushioning characteristics easily.

This will be described in more detail. In the multi-stage coiled portion 52 and in the spiral portion 51, the winding pitch of the wiring member is different. Therefore, the multi-stage coiled portion 52 having a high apparent spring constant and the spiral portion 51 having a spring constant lower than that of the multi-stage coiled portion 52 can be provided easily by use of the wiring member having the same spring constant and the same cross-sectional diameter. Namely, as described above, the spring constant of the multi-stage coiled and spiral spring 50 can be appropriately set easily in accordance with the vibration behavior such that the multi-stage coiled and spiral spring 50 has both of the multi-stage coiled portion 52 having a high apparent spring constant and the portion having a spring constant lower than that of the multi-stage coiled portion 52. Accordingly, the multi-stage coiled and spiral spring 50 and the cushioning device 10 can have desired cushioning characteristics.

The multi-stage coiled and spiral spring 50 includes the cylindrical multi-stage coiled portion 52 and the spiral portion 51. Owing to this, the multi-stage coiled and spiral spring 50 can have a more desirable spring constant as compared with a multi-stage coiled and spiral spring formed merely of the spiral portion 51 or merely of the multi-stage coiled portion 52 so as to have a desired height.

This will be described in more detail. In the case where the multi-stage coiled and spiral spring having a desired height is formed merely of the spiral portion 51, the pitch of the wiring member used to form the spiral shape becomes too large and thus the spring constant is decreased. As a result, a desired elasticity cannot be guaranteed. By contrast, in the case where merely the cylindrical coiled spring is used, the grommet 20 on the diametrically outer side and the collar member 30 on the diametrically inner side cannot be joined together in a cushionable manner.

In order to improve the vibration-damping property, the wiring member of the multi-stage coiled and spiral spring 50 needs to be long. In the case where only the multi-stage coiled portion 52 is formed of a wiring member having a length appropriate for guaranteeing the desired vibration-damping property in the state where the outer diameter of the wiring member is restricted by the second holding portion 22 of the grommet 20, the number of winds of the wiring member used to form the spiral shape is increased, and thus the winding pitch of the wiring member in the planar direction is decreased. As a result, the vibration absorption performance in the planar direction is lowered, which inhibits the improvement of the vibration-damping property.

By contrast, in the case where the multi-stage coiled and spiral spring 50 includes the cylindrical multi-stage coiled portion 52 and the spiral portion 51, the elasticity in the diametric direction and the height direction is guaranteed by the spiral portion 51, and a desired height is realized by the multi-stage coiled portion 52 having a high spring constant. Thus, the multi-stage coiled and spiral spring 50 can have a desired spring constant.

The multi-stage coiled and spiral spring 50 is located in such a direction that the held portion 54 is farther from the exhaust manifold 1 than the collar member attaching portion 53 is. Owing to this, the vibration-damping property of the cushioning device 10 can be improved.

This will be described in more detail. The multi-stage coiled and spiral spring 50 includes the multi-stage coiled portion 52 and the spiral portion 51. Owing to this, the elasticity of the multi-stage coiled and spiral spring 50 can be adjusted in the height direction in addition to the planar direction by use of two spring constants. Namely, the elasticity of the multi-stage coiled and spiral spring 50, which significantly influences the vibration-damping property of the multi-stage coiled and spiral spring 50, can be adjusted three-dimensionally based on the two spring constants.

In addition, the multi-stage coiled portion 52 is wound at a narrow pitch in the height direction and with an equal winding diameter. Therefore, it is considered that the friction between the winds of the wound wiring member used to form the multi-stage coiled portion 52 also contributes to the vibration absorption effect.

The multi-stage coiled portion 52 is wound at a narrow pitch in the height direction and with an equal winding diameter. Therefore, a part of the wound winding member enters inside another part of the wound winding member which is adjacent to the part in the height direction and expands the another part in the diametrically outer direction against the elastic force. As a result, among vibrations input to the multi-stage coiled and spiral spring 50, a vibration in the direction in which the held portion 54 and the collar member attaching portion 53 approach to each other can be absorbed.

The multi-stage coiled and spiral spring 50 is located in such a direction that the held portion 54 is farther from the exhaust manifold 1 than the collar member attaching portion 53 is. Owing to this, the held portion 54 on the diametrically outer side of the multi-stage coiled and spiral spring 50 is farther from the exhaust manifold 1 than the collar member attaching portion 53 on the diametrically inner side is. Namely, the heat insulator 3 held by the first holding portion 21 of the coupling portion 23, which holds the held portion 54 by the second holding portion 22, is located farther from the exhaust manifold 1 than the collar member 30 wound around the collar member attaching portion 53 is.

Accordingly, even when the heat insulator 3 itself vibrates by the vibration transmitted via the collar member 30 and the multi-stage coiled and spiral spring 50, the undesirable possibility that the heat insulator 3 itself collides against the exhaust manifold 1 can be reduced as compared with the case where the collar member 30 is located farther from the exhaust manifold 1 than the heat insulator 3 is. As a result, the generation of noise caused by the collision of the heat insulator 3 itself against the exhaust manifold 1 can be suppressed.

In this manner, the cushioning device 10, by adopting the above-described structure, provides a still improved vibration-damping property.

The collar member attaching portion 53 is included in the multi-stage coiled portion 52, and the held portion 54 is included in a diametrically outer part of the spiral portion 51. Namely, the multi-stage coiled portion 52 is located on the diametrically inner side of the multi-stage coiled and spiral spring 50 on which the collar member attaching portion 53 is provided, and the spiral portion 51 is located on the diametrically outer side of the multi-stage coiled and spiral spring 50 on which the held portion 54 is provided. Owing to this structure, the vibration which is input via the collar member 30 is first input to the spiral portion 51 on the diametrically outer side and is cushioned by the elasticity in the planar direction and the height direction. The vibration which is cushioned by the spiral portion 51 is further cushioned by the multi-stage coiled portion having a high apparent spring constant. Therefore, the undesirable possibility that the heat insulator 3 itself collides against the exhaust manifold 1 can be further reduced. As a result, generation of noise caused by the collision of the heat insulator 3 itself against the exhaust manifold 1 can be suppressed.

The collar member attaching portion 53 and the held portion 54 have an arcked shape; the second holding portion 22 has an annular shape as seen in a plan view; and the collar member 30 has a cylindrical shape, and the fitting recess 33 for allowing the collar member attaching portion 53 to fit thereinto is formed in a side surface of the cylindrical collar member 30. Owing to this, the multi-stage coiled and spiral spring 50 and the collar member 30 can be fitted together easily, and the held portion 54 can be held by the second holding portion 22.

This will be described in more detail. The collar member attaching portion 53 and the held portion 54 are formed to be arcked. In addition, the fitting recess 33 for allowing the collar member attaching portion 53 to fit thereinto is formed in the side surface of the cylindrical collar member 30. Therefore, the collar member attaching portion 53 formed to be arcked is fitted into the fitting recess 33 formed in the side surface of the cylindrical collar member 30. Thus, the multi-stage coiled and spiral spring 50 and the collar member 30 can be fitted into each other easily. Since the collar member attaching portion 53 formed to be arcked and the fitting recess 33 formed in the side surface of the cylindrical collar member 30 are fitted into each other, the multi-stage coiled and spiral spring 50 and the collar member 30 can be fitted into each other easily regardless of the position of the multi-stage coiled and spiral spring 50 in the circumferential direction with respect to the collar member 30.

The held portion 54 is formed to be arcked, and thus can be held by the second holding portion 22 regardless of the position of the held portion 54 in the circumferential direction.

In this manner, the multi-stage coiled and spiral spring 50 and the collar member 30 can be fitted into each other easily, and also the held portion 54 can be held by the second holding portion 22. Therefore, the ease of assembly of the cushioning device 10 can be improved.

In addition, in the case where the collar member attaching portion 53 formed to be arcked is fitted into the fitting recess 33 formed in the side surface of the cylindrical collar member 30, the number of components can be reduced as compared with the case where, for example, the collar member attaching portion 53 of the multi-stage coiled and spiral spring 50 is fitted into the fitting recess 33 of the collar member 30 by use of a separate member. Accordingly, the cushioning device 10 can be reduced in weight and can be produced at lower cost.

The gap S for improving the vibration-damping property is provided between the fitting recess 33 and the collar member attaching portion 53. Therefore, the vibration-damping property of the cushioning device 10 can be further improved. This will be described in more detail. The gap S for improving the vibration-damping property is provided in the state where the collar member attaching portion 53 formed to be arcked is held by the fitting recess 33; namely, the gap S of only about 0.2 mm is provided for improving the vibration-damping property. Therefore, unlike in the cushioning device 5 of the conventional art, in which the gap 17 (see FIG. 15) is actively formed in the axial direction and the radial direction (planar direction) between the collar member 10 and the cushioning member 8 such that the collar member 10 and the cushioning member 8 are loosely movable, no colliding noise is generated by the collar member attaching portion 53 or the fitting recess 33. Thus, the vibration input via the collar member 30 can be absorbed by the gap S. The gap S can also block the heat transmission.

The collar member 30 includes the upper collar 31 and the lower collar 32 assembled together. The upper collar 31 and the lower collar 32 each have a generally L-shaped cross-section. The upper collar 31 and the lower collar 32 respectively include thick portions 31b and 32b which have an appropriate thickness in a diametric direction of the collar member and also include disc-shaped ring portions 31a and 32a protruding in the diametrically outer direction from one of a top end and a bottom end of the respective thick portions. The upper collar 31 and the lower collar 32 are assembled such that the ring portions 31a and 32a are located on the outer side and such that the bottom surface 31ba of the thick portion 31b and the top surface 32ba of the thick portion 32b face each other. Owing to this, the product reliability of the cushioning device 10 having a high vibration-damping property can be improved.

This will be described in more detail. The collar member 30 includes the upper collar 31 and the lower collar 32 assembled together. The upper collar 31 and the lower collar 32 each have a generally L-shaped cross-section. The upper collar 31 and the lower collar 32 respectively include thick portions 31b and 32b having an appropriate thickness in the diametric direction of the collar member and also include disc-shaped ring portions 31a and 32a protruding in the diametrically outer direction from one of the top end and the bottom end of the respective thick portions. The upper collar 31 and the lower collar 32 are assembled such that the ring portions 31a and 32a are located on the outer side and such that the bottom surface 31ba of the thick portion 31b and the top surface 32ba of the thick portion 32b face each other. Owing to this, a space enclosed by the thick portions 31b and 32b facing each other and the ring portions 31a and 32a can form the fitting recess 33.

The bottom surface 31ba of the thick portion 31b and the top surface 32ba of the thick portion 32b face each other in the state where the upper collar 31 and the lower collar 32 are assembled. Therefore, during a step of inserting the attaching bolt 42 into the bolt hole 40 of the assembled collar member 30 and thus securing the attaching bolt 42 to the exhaust manifold 1, the fitting recess 33 defined by the ring portions 31a and 32a can be prevented from being deformed due to the tightening pressure of the attaching bolt 42. Accordingly, the gap S for improving the vibration-damping property can be formed without fail between the collar member attaching portion 53 and the fitting recess 33. The vibration input via the collar member 30 can be absorbed by the gap S without causing a colliding noise at the collar member attaching portion 53 or the fitting recess 33. In addition, transmission of heat can be blocked by the gap S.

The heat insulator 3 is formed of one or a plurality of aluminum alloy plates of a three-dimensional shape having a corrugated shape extending in directions crossing each other. The corrugated shape of the heat insulator 3 is squashed to form generally flat squashed portions 3b. One of two directions crossing each other of the heat insulator 3 is defined as a direction crossing the main ridgeline portion for forming the three-dimensional shape. In addition, the squashed portions 3b of the multi-stage coiled and spiral spring 50 are held by the first holding portion 21. As a result, the heat insulator 3 can, for example, suppress the heat radiation and the vibration transmission from the engine 2 of an automobile or the like and/or the exhaust manifold 1 thereof.

This will be described in more detail. For example, the heat insulator 3 formed of a material having an appropriate heat-resistant performance is attached by use of the above-described cushioning device having a high vibration-damping property. Therefore, the heat radiation from the engine 2 and/or the exhaust manifold 1 thereof, which are heat sources, can be prevented. In addition, the vibration transmission from the engine 2 and/or the exhaust manifold 1 thereof, which are also vibration sources, to the heat insulator 3 can be prevented.

Accordingly, the heat insulator 3 can be attached in a high vibration-damping state as compared with the case where, for example, the heat insulator 3 itself resonates with the vibration input from the vibration source.

The heat insulator 3 is formed of one or a plurality of aluminum alloy plates having a corrugated shape extending in directions crossing each other. Therefore, the heat insulator 3 is highly deformable. Thus, even in the case where, for example, the engine 2 and/or the exhaust manifold 1 thereof has a complicated shape, the heat insulator 3 can be shaped in accordance therewith. Since the heat insulator 3 shaped in accordance with the shapes of the engine 2 and/or the exhaust manifold 1 thereof can be attached, the heat radiation from the engine 2 and/or the exhaust manifold 1 thereof can be prevented with more certainty.

The directions crossing each other may be the X direction and the Y direction, which cross each other perpendicularly. The corrugated shape is as follows. The ridges extending in the Y direction and the troughs extending in the Y direction are alternately located in the X direction. The ridges include the apexes 121a and the bottoms 121b, rising from the troughs, alternately located in the Y direction. The troughs include the flat portions and the concaved portions alternately located in the Y direction. Each apex 121a includes a pair of side walls rising from the troughs in an inverted trapezoidal shape and a relatively flat apex portion connecting tips of the side walls to each other. The apex 121a is curved inward so that a top portion of the apex 121a is wider than a base portion thereof. Each concaved portion includes a pair of side walls falling from the bottoms 121b and a recessed portion connecting tips of the side walls to each other. The apexes 121a and the flat portions are intermittently continuous in the X direction, and the bottoms 121b and the concaved portions are intermittently continuous in the X direction. Therefore, the shape processability of the heat insulator 3 can be further improved. Thus, the heat insulator 3 can be formed into a shape more matching the shapes of the engine 2 and/or the exhaust manifold 1 thereof, to which the heat insulator 3 is to be attached. As a result, the heat radiation from the engine 2 and/or the exhaust manifold 1 thereof can be prevented with more certainty.

Figure 14:
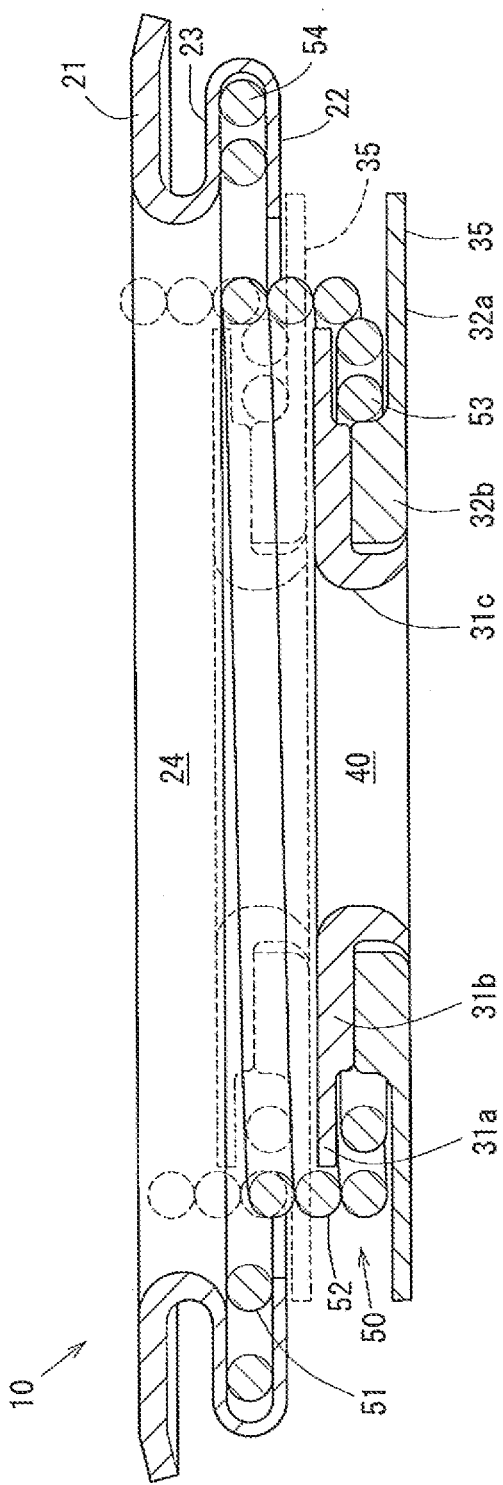
FIG. 14 illustrates a cushioning device in another embodiment.

The ring portion 32a of the lower collar 32, among the upper collar 31 and the lower collar 32 included in the collar member 30, may have a large-diameter flange portion 35 which has a large diameter and is contactable with the second holding portion 22 as shown in FIG. 14.

Owing to this, a cushioning device 10 having a higher vibration-damping property can be provided.

This will be described in more detail. The ring portion 32a of the lower collar 32, among the upper collar 31 and the lower collar 32 included in the collar ember 30, has a large-diameter flange portion 35 which has a large diameter and is contactable with the second holding portion 22. Owing to this, even when the grommet 20 to be joined to the heat insulator 3 is displaced toward the exhaust manifold 1 due to a large amplitude, the large-diameter flange portion 35 included in the ring portion 32a of the lower collar 32 contacts the second holding portion 22 and thus can prevent the second holding portion 22 from directly contacting the exhaust manifold 1. Accordingly, the vibration-damping property can be provided without fail even against a large vibration caused by, for example, resonance or the like.

In the above description, the ring portion 32a of the lower collar 32 is formed to have a large diameter to form the large-diameter flange portion 35. Alternatively, the large-diameter flange portion 35 as a separate member may be secured to the ring portion 32a of the lower collar 32.

The cushioning device 10 in this example has been described as being used for attaching the heat insulator 3 to the exhaust manifold 1 which is to be mounted on the engine 2 of an automobile, but the present invention is not limited to such an example. For example, the cushioning device according to the present invention may be used to attach any of covers for various uses, which are to be attached to any other part of the automobile, for example, an undercover for covering the bottom of the vehicle body. The cushioning device according to the present invention may also be used to attach any of covers for various uses to an object other than an automobile.

The vibration target member according to the present invention corresponds to the exhaust manifold 1 in the above embodiment; and similarly, the connection target member corresponds to the heat insulator 3;

the cushioning member corresponds to the multi-stage coiled and spiral spring 50;

the coupling member corresponds to the grommet 20;

the tightening member corresponds to the attaching bolt 42;

the tightening member insertion portion corresponds to the bolt hole 40;

the cushioning member holding portion and the fitting recess correspond to the fitting recess 33;

the another portion and the spiral portion correspond to the spiral portion 51;

the high spring portion and the coiled portion correspond to the multi-stage coiled portion 52;

the thick ring portions correspond to the thick portions 31b and 32b;

the end portions of the thick ring portions correspond to the bottom surface 31ba of the thick portion 31b and the top surface 32ba of the thick portion 32b;

the flange portions correspond to the ring portions 31a and 32a;

the collar member components correspond to the upper collar 31 and the lower collar 32;

the vibration target member-side component corresponds to the lower collar 32;

the connection target member-side component corresponds to the upper collar 31;

the metal cover corresponds to the heat insulator 3;

the internal combustion engine corresponds to the engine 2;

the exhaust path corresponds to the exhaust manifold 1;

the squashing target portion corresponds to the squashed portion 3b;

the first direction corresponds to the Y direction;

the second direction corresponds to the X direction;

the first rising portion corresponds to the apex 121a; and the second rising portion corresponds to the bottom 121b.

Nonetheless, the present invention is not limited to the above-described embodiment.

For example, in this embodiment, the second holding portion 22, the coupling portion 23 and the first holding portion 21 of the collar member 30 are located in this order from the side of the bolt boss 41 provided on the exhaust manifold 1. Alternatively, these elements may be located in the order of the first holding portion 21, the coupling portion 23 and the second holding portion 22 from the side of the bolt boss 41 provided on the exhaust manifold 1.

The multi-stage coiled portion 52 having an apparent spring constant higher than that of the spiral portion 51 is formed of a wiring member wound in a cylindrical shape at a narrow pitch. Alternatively, the multi-stage coiled portion 52 may be formed of a winding member having a higher spring constant or a winding member having the same spring constant but having a larger diameter. The spiral portion 51 is provided on the diametrically outer side of the multi-stage coiled and spiral spring 50, and the multi-stage coiled portion 52 is provided on the diametrically inner side. Alternatively, the spiral portion 51 may be provided on the diametrically inner side of the multi-stage coiled and spiral spring 50, and the multi-stage coiled portion 52 may be provided on the diametrically outer side. Still alternatively, the spiral portion 51 may be provided in an intermediate part of the multi-stage coiled and spiral spring 50, and the multi-stage coiled portion 52 may be provided on both of the diametrically outer side and the diametrically inner side thereof. Still alternatively, the multi-stage coiled portion 52 may be provided in an intermediate part of the multi-stage coiled and spiral spring 50, and the spiral portion 51 may be provided on both of the diametrically outer side and the diametrically inner side thereof.

The grommet 20 includes the first holding portion 21 for holding the heat insulator 3 on the diametrically outer side, the second holding portion 22 for holding the multi-stage coiled and spiral spring 50 on the diametrically inner side, and the coupling portion 23 for coupling the first holding portion 21 and the second holding portion 22 to each other. The grommet 20 has an annular shape having an S-shaped cross-section. It is sufficient that the grommet 20 holds the heat insulator 3 on the diametrically outer side and holds the multi-stage coiled and spiral spring 50 on the diametrically inner side. Thus, for example, the grommet 20 may have inverted U-shaped or V-shaped holding portions in an outer direction for holding the heat insulator 3 and the multi-stage coiled and spiral spring 50 and also an annular member for coupling the holding portions to each other.

In the above description, the collar member 30 is formed of the upper collar 31 convexed downward and the lower collar 32 which is caulked with the upper collar 31. The collar member 30 is attached to the cushioning device 10 in this direction. Alternatively, the upper collar 31 and the lower collar 32 may be located oppositely.

REFERENCE SIGNS LIST

1 . . . Exhaust manifold
2 . . . Engine
3 . . . Heat insulator
3b . . . Squashed portion
10 . . . Cushioning device
20 . . . Grommet
21 . . . First holding portion
22 . . . Second holding portion
23 . . . Coupling portion
30 . . . Collar member
31 . . . Upper collar 32 ... Lower collar
31a, 32a ... Ring portion
31b, 32b ... Thick portion
31ba ... Bottom surface
32ba ... Top surface
33 ... Fitting recess
35 ... Large-diameter flange portion
40 ... Bolt hole
42 ... Attaching bolt
50 ... Multi-stage coiled and spiral spring
51 ... Spiral portion
52 ... Multi-stage coiled portion
53 ... Collar member attaching portion
54 ... Held portion
121 ... Ridge
122 ... Trough
121a ... Apex
121b ... Bottom
122a ... Flat portion
122b ... Concaved portion
S ... Gap

The invention claimed is:

1. A cushioning device to be located between a vibration target member, which is a vibration source, and a connection target member, which is a connection target, the cushioning device connecting the vibration target member and the connection target member to each other and cushioning transmission of a vibration from the vibration target member to the connection target member,
the cushioning device comprising a cushioning member for cushioning the vibration, a joining member for joining the cushioning member and the connection target member to each other, and a collar member located between a tightening member tightened to the vibration target member and the cushioning member;
wherein:
the joining member includes:
a first holding portion for enclosing the cushioning member and holding the connection target member on a diametrically outer side;
a second holding portion for holding the cushioning member on a diametrically inner side; and
a coupling portion for coupling the first holding portion and the second holding portion to each other;
the collar member includes a tightening member insertion portion, provided on the diametrically inner side, for allowing the tightening member to pass therethrough and a cushioning member, provided on the diametrically outer side holding portion, for holding a collar member attaching portion;
the cushioning member is formed of a wiring member having a spiral shape as seen in a plan view, and includes the collar member attaching portion, provided at a diametrically central part of the spiral shape as seen in a plan view, for allowing the collar member to be attached thereto and a held portion held by the second holding portion, the held portion being provided in a diametrically outer part of the spiral shape as seen in a plan view; and
at least a part of the spiral shape as seen in a plan view of the cushioning member has a high spring portion having a spring constant higher than that of another portion of the spiral shape as seen in a plan view.

2. A cushioning device according to claim 1, wherein:
the high spring portion is formed of a coiled portion wound in a generally cylindrical shape extending in a height direction; and
the another portion having a spring constant lower than that of the coiled portion is formed of a spiral portion having a level in the height direction gradually changed along a spiral direction.

3. A cushioning device according to claim 2, wherein the cushioning member is located in such a direction that the held portion is farther from the vibration target member than the collar member attaching portion is.

4. A cushioning device according to claim 3, wherein the collar member attaching portion is included in the coiled portion, and the held portion is included in a diametrically outer part of the spiral portion.

5. A cushioning device according to claim 1, wherein:
the collar member attaching portion and the held portion have an arcked shape;
the second holding portion has an annular shape as seen in a plan view; and
the collar member has a cylindrical shape, and the cushioning member holding portion is a fitting recess, formed in a side surface of the cylindrical collar member, for allowing the collar member attaching portion to fit thereinto.

6. A cushioning device according to claim 5, wherein a gap for improving a vibration-damping property is provided between the fitting recess and the collar member attaching portion.

7. A cushioning device according to claim 6, wherein the collar member includes collar member components assembled together, the collar member components each having a generally L-shaped cross-section and including a thick ring portion which defines the tightening member insertion portion and has an appropriate thickness in a diametric direction of the collar member and also including a disc-shaped flange portion protruding in a diametrically outer direction from one of a top end and a bottom end of the thick ring portion, the collar member components being assembled such that the flange portions are located on the outer side and end portions of the thick ring portions face each other.

8. A cushioning device according to claim 7, wherein:
the collar member components included in the collar member are a vibration target member-side component provided on the side of the vibration target member and a connection target member-side component provided on the side of the connection target member; and
the flange portion of the vibration target member-side component has a large-diameter flange portion which has a large diameter and is contactable with the second holding portion.

9. A metal cover formed of one or a plurality of aluminum alloy plates so as to have a three-dimensional shape, the one or the plurality of aluminum alloy plates having a corrugated shape extending in directions crossing each other, wherein:
the corrugated shape in a squashing target portion is squashed to be generally flat;
one of the directions crossing each other is defined as a direction crossing a main ridgeline portion forming the three-dimensional shape;
a cushioning device according to claim 1 is used; and
a vibration target member is formed of an internal combustion engine and/or an exhaust path thereof, and the first holding portion holds the squashing target portion.

10. A metal cover according to claim 9, wherein:
the directions crossing each other are a first direction and a second direction crossing each other perpendicularly; and the corrugated shape is such that:

ridges and troughs each extending in the first direction are alternately located in the second direction;

the ridges include first rising portions and second rising potions rising from the troughs and alternately located in the first direction;

the troughs include flat portions and concaved portions alternately located in the first direction;

the first rising portions each include a pair of side walls rising from the troughs in an inverted trapezoidal shape and a relatively flat apex connecting tips of the side walls to each other, and the first rising portion is curved inward so that a top portion of the first rising portion is wider than a base portion thereof;

the concaved portions each include a pair of side walls falling from the second rising portions and a recessed portion connecting tips of the side walls to each other; and the first rising portions and the flat portions are intermittently continuous in the second direction, and the second rising portions and the concaved portions are intermittently continuous in the second direction.

11. A cushioning device according to claim 2, wherein:

the collar member attaching portion and the held portion have an arcked shape;

the second holding portion has an annular shape as seen in a plan view; and the collar member has a cylindrical shape, and the cushioning member holding portion is a fitting recess, formed in a side surface of the cylindrical collar member, for allowing the collar member attaching portion to fit thereinto.

12. A cushioning device according to claim 3, wherein:

the collar member attaching portion and the held portion have an arcked shape;

the second holding portion has an annular shape as seen in a plan view; and the collar member has a cylindrical shape, and the cushioning member holding portion is a fitting recess, formed in a side surface of the cylindrical collar member, for allowing the collar member attaching portion to fit thereinto.

13. A cushioning device according to claim 4, wherein:

the collar member attaching portion and the held portion have an arcked shape;

the second holding portion has an annular shape as seen in a plan view; and the collar member has a cylindrical shape, and the cushioning member holding portion is a fitting recess, formed in a side surface of the cylindrical collar member, for allowing the collar member attaching portion to fit thereinto.

* * * * *